(12) United States Patent
Izumi et al.

(10) Patent No.: US 7,546,196 B2
(45) Date of Patent: Jun. 9, 2009

(54) LINE PRESSURE CONTROL APPARATUS FOR BELT-DRIVE CONTINUOUSLY VARIABLE TRANSMISSION

(75) Inventors: Tetsuya Izumi, Yokohama (JP); Hironori Nihei, Kanagawa (JP); Seonjae Kim, Yokohama (JP); Takayuki Tanaka, Kanagawa (JP); Toshiji Iida, Kanagawa (JP)

(73) Assignee: JATCO Ltd, Fuji-shi, Shizuoka (JP)

( * ) Notice: Subject to any disclaimer, the term of this patent is extended or adjusted under 35 U.S.C. 154(b) by 652 days.

(21) Appl. No.: 11/242,141

(22) Filed: Oct. 4, 2005

(65) Prior Publication Data
US 2006/0073924 A1 Apr. 6, 2006

(30) Foreign Application Priority Data
Oct. 5, 2004 (JP) .............................. 2004-292789

(51) Int. Cl.
G06F 17/00 (2006.01)
F16H 61/00 (2006.01)
(52) U.S. Cl. .............................. 701/51; 474/28; 474/18
(58) Field of Classification Search .................. 701/51; 477/34; 474/18, 28, 8, 32
See application file for complete search history.

(56) References Cited

U.S. PATENT DOCUMENTS

| 4,826,467 A | * | 5/1989 | Reese et al. .................... 474/14 |
| 5,184,981 A | * | 2/1993 | Wittke .......................... 474/19 |
| 7,351,173 B2 | * | 4/2008 | Uchisasai et al. .............. 475/5 |

FOREIGN PATENT DOCUMENTS

JP 2004-100737 A 4/2004

* cited by examiner

Primary Examiner—Yonel Beaulieu
(74) Attorney, Agent, or Firm—Foley & Lardner LLP

(57) ABSTRACT

In a line pressure control apparatus of a belt-drive CVT, a shift is achieved by varying V- groove widths of primary and secondary pulleys by a differential pressure between primary and secondary pulley pressures, originating from line pressure. The differential pressure is created by bringing a shift actuator, such as a step motor, into a control position corresponding to a target transmission ratio. The target transmission ratio is calculated based on a theoretical transmission ratio based on engine-and-vehicle operating conditions, taking account of a hardware response delay and a disturbance. The target transmission ratio is converted into a reference-model operative position, corresponding to a reference-model number-of-steps of the shift actuator. An actual transmission ratio is converted into an actual-transmission-ratio related operative position. Line pressure is corrected in a manner so as to reduce the positional deviation between the reference-model operative position and the actual-transmission-ratio related operative position.

20 Claims, 13 Drawing Sheets

LINE PRESSURE CONTROL APPARATUS FOR BELT-DRIVE CONTINUOUSLY VARIABLE TRANSMISSION

TECHNICAL FIELD

The present invention relates to a line pressure control apparatus for correcting line pressure of a belt-drive continuously variable transmission (belt-drive CVT) to prevent the line pressure, which is used as a source pressure to automatically control gear shifting of the belt-drive CVT, from becoming excessive or deficient.

BACKGROUND ART

In some belt-drive continuously variable transmissions (belt-drive CVTs), a ratio-changing actuator or a shift actuator, such as a step motor, is brought into a control position (the number of angular steps) corresponding to a target transmission gear ratio (or a target pulley ratio), thereby producing a differential pressure between primary and secondary pulley pressures in response to the target transmission gear ratio. The V-groove widths of primary and secondary variable-width pulleys, whose V grooves are aligned with each other, are varied by way of the differential pressure between the primary and secondary pulley pressures. Consequently, the target transmission gear ratio is achieved. Generally, in determining the number of angular steps (denoted by "Step") of the step motor, a theoretical transmission gear ratio, denoted by Ip and corresponding to the engine/vehicle operating conditions, is taken or regarded as a target transmission gear ratio I(0). The number of angular steps of the step motor (the shift actuator) is calculated or retrieved based on the target transmission ratio I(0) from a preprogrammed angular steps Step versus transmission ratio ip characteristic map shown in FIG. 14. The line pressure, from which primary and secondary pulley pressures originate, uses a medium consisting of working fluid (transmission oil) coming from an oil pump, which is driven by the engine. Thus, the pressure level of line pressure greatly affects the engine's fuel economy or the fuel consumption rate of the vehicle. For the reasons discussed above, it is customary to design the CVT, such that the line pressure is adjusted to a bare minimum value. However, during execution of line pressure control, there is a possibility that the line pressure will become deficient, for example, due to variations between hardware units or each hardware's individual operating characteristics, and thus the line pressure level will become less than the primary or secondary pulley pressure. Assuming that the line pressure becomes deficient, the actual Step-ip characteristic tends to deviate from the preprogrammed Step-ip characteristic shown in FIG. 14. For instance, the preprogrammed Step-ip characteristic of FIG. 14 is displaced as indicated by the solid line in FIG. 11, where the Step-ip characteristic not displaced is indicated by the broken line in FIG. 11. In the presence of the deficient line pressure produced, for the same target transmission gear ratio I(0), more angular steps are required. In particular, the target transmission gear ratio I(0) cannot be achieved, unless an instruction (a control command) is given to the step motor to handle extra angular steps a. Owing to such a deficient line pressure level, there is an increased tendency for the achievement of the target transmission gear ratio I(0) to be delayed. In the case that the highest transmission ratio is required, it will not be achieved. Suppose that, in a conventionally adopted scheme, the primary pulley pressure is controlled to control the differential pressure between the primary and secondary pulley pressures. The above-described case where the highest transmission ratio is not achieved is described below by referring to FIG. 15 regarding this conventional scheme. In FIG. 15, the horizontal axis indicates the valve stroke (i.e., the valve opening) of a shift control valve controlled by means of the step motor, while the vertical axis indicates the hydraulic pressure. When the line pressure is sufficiently high, the primary pulley pressure originating from the line pressure reaches the required primary pulley pressure corresponding to the target transmission gear ratio Ip (=the highest transmission ratio) at a stroke amount L1 as indicated by the solid line in FIG. 15. Thus, the highest transmission ratio can be achieved. However, when the line pressure is lower than the required primary pulley pressure corresponding to the target transmission gear ratio Ip (=the highest transmission ratio), the primary pulley pressure originating from the line pressure does not reach the required primary pulley pressure indicated by the broken line in FIG. 15. Hence, the highest transmission ratio is not reached. For the reasons discussed above, the earlier line pressure control apparatus corrects the line pressure based on the deviation |Astep-Bstep| between the number of angular steps Astep of the stepping motor corresponding to the target transmission gear ratio I(0) and the number of angular steps Bstep calculated or estimated based on the actual transmission gear ratio ip. In the earlier line pressure control apparatus, the line pressure is corrected just before a particular state, where the highest transmission ratio is not reached, takes place, in other words, immediately after the line pressure becomes deficient or excessive. As set forth above, the earlier line pressure control apparatus initiates or executes line pressure correction (or line pressure compensation), in the case that the line pressure becomes deficient, as well as in the case that the line pressure becomes excessive, thus avoiding the problem that the approach of actual transmission gear ratio ip to target transmission gear ratio I(0) is delayed. One such line pressure control apparatus has been disclosed in Japanese Patent Provisional Publication No. 2004-100737 (hereinafter is referred to as "JP2004-100737").

SUMMARY OF THE INVENTION

However, the previously-described earlier line pressure control apparatus disclosed in JP2004-100737 has the following drawbacks. For instance, under high-speed conditions, where the transmission gear ratio (the pulley ratio) is kept at the high speed side transmission ratio, assuming that the accelerator pedal is slowly depressed to accelerate the vehicle, the line pressure will be increased with a delay in line-pressure rise. As a result, there is a possibility of undesired hunting. For instance, the line pressure may become less than the primary or secondary pulley pressure. Otherwise, the line pressure may be increased in an unintended manner. Such hunting in ratio-changing control (shifting control) is undesirable. Furthermore, the inventors of the present invention have reached the recognition that there still remains room to lower the line pressure supplied during the vehicle start-up period for improved fuel economy or reduced fuel consumption rate.

In view of the foregoing recognition of the facts, the present invention has been made. It is an object of the invention to provide a line pressure control apparatus which is used with a belt-drive continuously variable transmission (belt-drive CVT) and which can suppress the line pressure in order to improve fuel economy. It is a more specific object of the invention to provide a line pressure control apparatus capable of balancing two contradictory requirements, namely improvement of a response delay occurring due to undesirable suppressed line pressure and unnecessary line-pressure rise (in other words, timely effectively suppressed line pressure, that is, improved fuel economy), while preventing undesirable hunting in ratio-changing control.

In order to accomplish the aforementioned and other objects of the present invention, a line pressure control apparatus of a belt-drive continuously variable transmission employing a primary variable-width pulley of a driving pulley side, a secondary variable-width pulley of a driven pulley side, a drive belt running in the primary and secondary pulleys, and a shift actuator, and whose target transmission ratio is achieved by varying V-groove widths of the primary and secondary pulleys by way of a differential pressure between primary and secondary pulley pressures, both originating from line pressure, the differential pressure being created by bringing the shift actuator into a control position corresponding to the target transmission ratio, comprises a vehicular information detector that detects engine-and-vehicle operating conditions, a hydraulic modulator that regulates the primary and secondary pulley pressures, a control unit being configured to be electrically connected to the vehicular information detector and the hydraulic modulator, for automatically controlling the hydraulic actuator depending on the operating conditions, the control unit comprising a processor programmed to perform the following, determining a theoretical transmission ratio based on the operating conditions, calculating the target transmission ratio based on the theoretical transmission ratio, taking account of at least a hardware response delay, converting the target transmission ratio into a reference-model operative position of the shift actuator, calculating an actual transmission ratio as a ratio of a rotational speed of the primary pulley to a rotational speed of the secondary pulley, converting the actual transmission ratio into an actual-transmission-ratio related operative position of the shift actuator, calculating a positional deviation between the reference-model operative position and the actual-transmission-ratio related operative position, and correcting the line pressure in a manner so as to reduce the positional deviation.

According to another aspect of the invention, a method of controlling a belt-drive continuously variable transmission employing a primary variable-width pulley of a driving pulley side, a secondary variable-width pulley of a driven pulley side, a drive belt running in the primary and secondary pulleys, and a shift actuator, and whose target transmission ratio is achieved by varying V-groove widths of the primary and secondary pulleys by way of a differential pressure between primary and secondary pulley pressures, both originating from line pressure, the differential pressure being created by bringing the shift actuator into a control position corresponding to the target transmission ratio, the method comprising detecting engine-and-vehicle operating conditions, determining a theoretical transmission ratio based on the operating conditions, calculating the target transmission ratio based on the theoretical transmission ratio, taking account of at least a hardware response delay and a disturbance, converting the target transmission ratio into a reference-model operative position of the shift actuator, calculating an actual transmission ratio as a ratio of a rotational speed of the primary pulley to a rotational speed of the secondary pulley, converting the actual transmission ratio into an actual-transmission-ratio related operative position of the shift actuator, calculating a positional deviation between the reference-model operative position and the actual-transmission-ratio related operative position, and correcting the line pressure in a manner so as to reduce the positional deviation.

The other objects and features of this invention will become understood from the following description with reference to the accompanying drawings.

DESCRIPTION OF THE PREFERRED EMBODIMENTS

Figure 1:
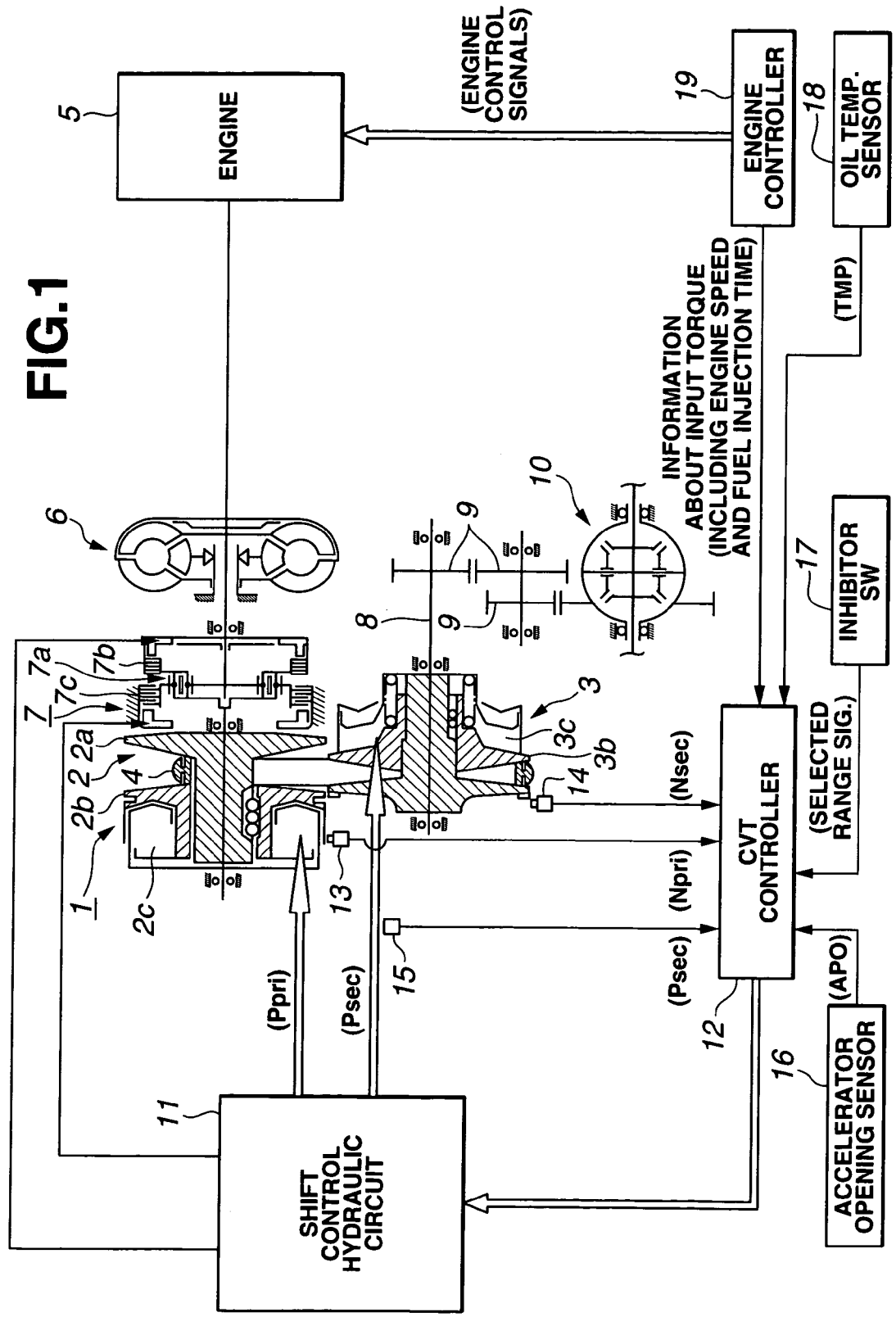
FIG. 1 is a system diagram of an embodiment illustrating part of a power train and a belt-drive continuously variable transmission control system (or a ratio-changing control system) of an automotive vehicle employing a line pressure control apparatus of a belt-drive CVT.

Referring now to the drawings, particularly to FIG. 1, there is shown part of a power train of an automotive vehicle with a belt-drive continuously variable transmission (belt-drive CVT) 1, and a detailed structure of a ratio-changing control system. As seen from the system diagram of FIG. 1, belt-drive CVT 1 uses an endless drive belt 4, such as an endless segmented steel belt, running in a pair of variable-width pulleys 2 and 3, namely primary and secondary—driving and driven—pulleys whose effective diameters are continuously variable to provide varying pulley ratios or transmission gear ratios. As shown in FIG. 1, V grooves of primary and secondary pulleys 2 and 3 are aligned with each other, and drive belt 4 is wound on the V grooves of primary and secondary pulleys 2 and 3. An engine crankshaft of an engine 5 is coaxially aligned with the axis of primary pulley 2. Power output produced by engine 5 is transmitted through a lockup torque converter 6 and a forward-and-reverse switching mechanism or a forward-and-reverse clutch (simply, F/R clutch) 7 to belt-drive CVT 1. F/R clutch 7 is mainly constructed by a double-pinion planetary gearset 7a. A sun gear of planetary gearset 7a is connected through torque converter 6 to engine 5, whereas a planet-pinion carrier of planetary gearset 7a is connected to primary pulley 2. F/R clutch 7 is also comprised of a forward clutch 7b through which the sun gear and the carrier of planetary gearset 7a are directly coupled with each other or uncoupled from each other, and a reverse brake 7c serving to stop or permit rotation of the ring gear of planetary gearset 7a. With forward clutch 7b engaged, torque is transmitted from engine 5 via torque converter 6 and F/R clutch 7 to primary pulley 2 without changing the rotation direction. On the contrary, with reverse brake 7c applied, torque, transmitted from engine 5 into torque converter 6, is further transmitted to primary pulley 2, with the reduced rotational speed and different rotation direction. Thereafter, torque, transmitted through primary pulley 2 and drive belt 4 to secondary pulley 3, is transmitted via a CVT output shaft 8 and a gear set 9 to a differential gear 10, and then transmitted via axle driveshafts to drive wheels (not shown).

In order to change a ratio of the rotational speed of primary pulley 2 to the rotational speed of secondary pulley 3, that is, a transmission gear ratio or a pulley ratio of belt-drive CVT 1 during power transmission, the V grooves of primary and secondary pulleys 2 and 3 are constructed as follows.

The V groove of primary variable-width input pulley 2 is constructed by a stationary flange (or a stationary sheave) 2a and an adjustable flange (or a movable sheave) 2b axially slidable on linear ball bearing splines (not shown) for varying the width of the V groove of primary pulley 2 by hydraulic pressure, often called a "primary pulley pressure Ppri". In a similar manner, the V groove of secondary pulley 3 is constructed by a stationary flange 3a and an adjustable flange 3b axially slidable on linear ball splines (not shown) for varying the width of the V groove of secondary pulley 3 by way of spring bias (a preload of a preloading spring) plus hydraulic pressure, often called a "secondary pulley pressure Psec". In order to steplessly vary the pulley ratio of belt-drive CVT 1, the adjustable flanges of primary and secondary pulleys 2 and 3 are designed to slide axially on the linear ball bearing splines, relative to the fixed flanges and to prevent relative rotation of the adjustable flanges to the respective fixed flanges. Actually, the radius of rotation of drive belt 4 of the primary pulley side, in other words, the radius of the contact circle of drive belt 4 wound on the V groove of primary pulley 2, that is, half of the effective pitch diameter of primary input pulley 2 and the radius of rotation of drive belt 4 of the secondary pulley side, in other words, the radius of the contact circle of drive belt 4 wound on the V groove of secondary pulley 3, that is, half of the effective pitch diameter of secondary output pulley 3 can be independently varied by controlling the primary pulley pressure Pri and the secondary pulley pressure Psec independently of each other. In more detail, the primary-pulley adjustable flange 2b is forced toward the associated stationary flange 2a by supplying primary pulley pressure Ppri to a primary pulley actuation chamber (or a primary pulley actuation cylinder) 2c and simultaneously the secondary-pulley adjustable flange 3b is forced toward the associated stationary flange 3a by supplying secondary pulley pressure Psec to a secondary pulley actuation chamber (or a secondary pulley actuation cylinder) 3c, to enable power transmission between primary and secondary pulleys 2 and 3 via drive belt 4, while keeping the drive belt in friction-contact with the V grooves of input and output pulleys 2 and 3. With the previously-described CVT control hydraulic circuit, during ratio changing (during a shift), it is possible to achieve a target transmission gear ratio (a desired pulley ratio) of belt-drive CVT 1 by varying the widths of V grooves of primary and secondary pulleys 2 and 3 by way of the pressure differential between primary and secondary pulley pressures Ppri and Psec controlled. Primary and secondary pulley pressures Ppri and Psec are created from the line pressure that is controlled as described in detail later.

The output of primary pulley pressure Ppri and the output of secondary pulley pressure Psec are controlled by means of a shift control hydraulic circuit (or a hydraulic modulator) 11. In a similar manner, the output of hydraulic pressure for engagement of forward clutch 7b and the output of hydraulic pressure for application of reverse brake 7c are controlled by means of shift control hydraulic circuit 11. Forward clutch 7b is engaged when the forward drive range (D range) is selected. On the other hand, reverse brake 7c is applied when the reverse drive range (R range) is selected. Shift control hydraulic circuit 11 performs ratio-changing control (shifting control) in response to a control command signal from a transmission controller (or a CVT control unit or a CVT controller) 12.

Therefore, the input interface circuitry of CVT controller 12 receives various input informational data signals, namely a signal from a primary pulley speed sensor 13 for detecting the rotational speed Npri of primary pulley 2, a signal from a secondary pulley speed sensor 14 for detecting the rotational speed Nsec of secondary pulley 3, a signal from a secondary pulley pressure sensor 15 for detecting the secondary pulley pressure Psec, a signal from an accelerator opening sensor 16 for detecting the amount of depression APO of the accelerator pedal, a signal from an inhibitor switch 17 that indicates the selected range, a signal from an oil temperature sensor 18 for detecting the temperature TMP of transmission working oil (CVT working fluid), and signals from an engine controller 19 regarding the transmission input torque (such as signals indicating the engine speed and fuel injection time length). The previously-noted engine controller 19 electronically controls engine 5.

Figure 2:
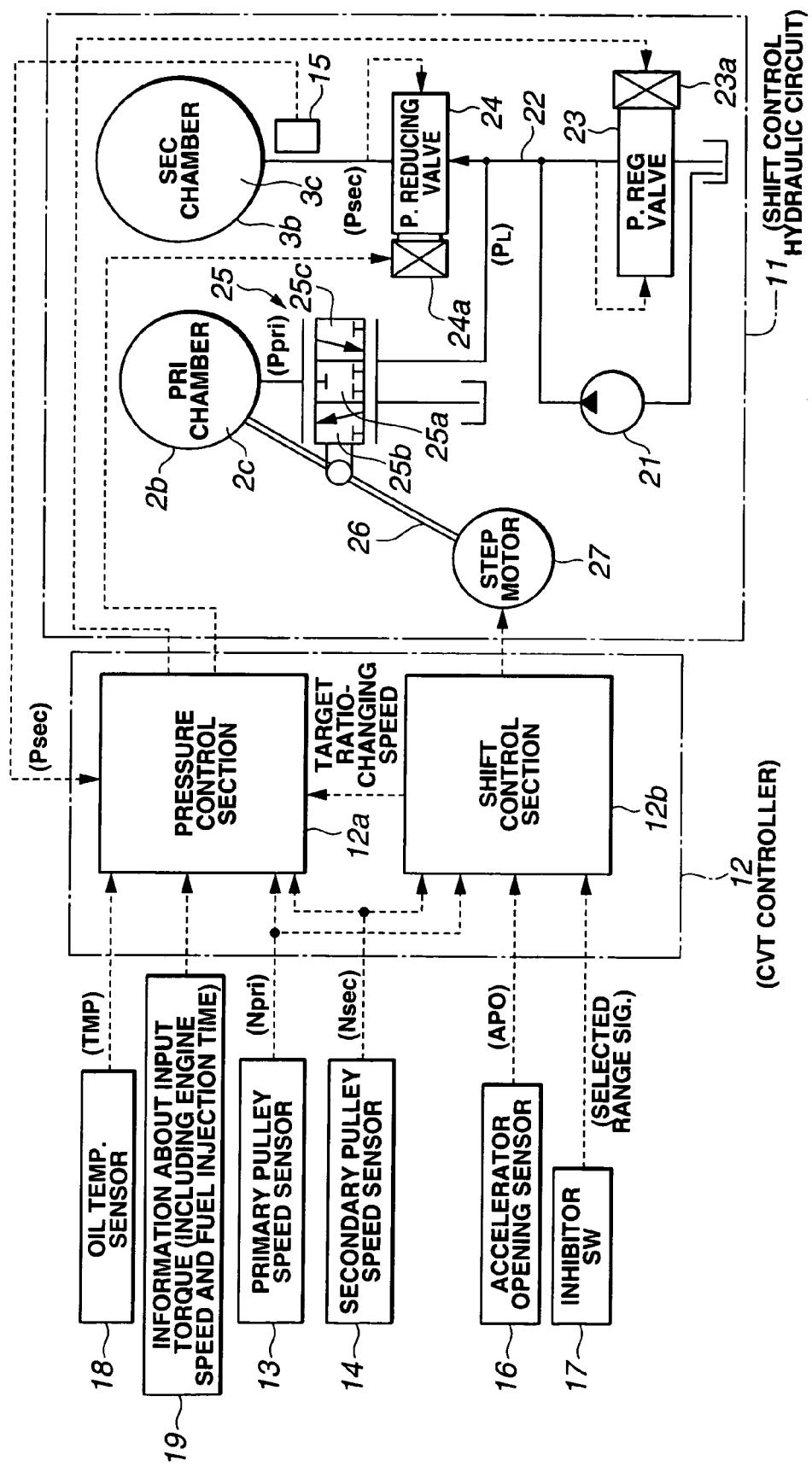
FIG. 2 is a system block diagram showing details of the ratio-changing control system shown in FIG. 1.

Shift control hydraulic circuit 11 and CVT controller 12 are as illustrated in FIG. 2. Shift control hydraulic circuit 11 is hereunder described in detail. Shift control hydraulic circuit 11 includes an oil pump 21, which is driven by engine 5. Line pressure $P_L$ is adjusted or regulated to a desired line pressure $P_L^*$ by means of a pressure regulator valve 23 using working oil as a medium, the oil being supplied into an oil circuit 22.

Line pressure $P_L$ in the oil circuit 22 is adjusted or regulated by a pressure-reducing valve 24 on one hand and supplied into the secondary pulley chamber 3c as the secondary pulley pressure Psec and is adjusted by a shift control valve 25 on the other hand and supplied into the primary pulley chamber 2c as the primary pulley pressure Ppri.

Pressure regulator valve 23 controls line pressure $P_L$ responsively to the duty cycle of an electromagnetic solenoid 23a. On the other hand, pressure-reducing valve 24 controls secondary pulley pressure Psec responsively to the duty cycle of an electromagnetic solenoid 24a.

Shift control valve 25 assumes a neutral position 25a, a pressure build-up position 25b, and a pressure reduction position 25c. To switch between these valve positions, shift control valve 25 is connected to the midpoint of a shift control link 26. A stepping motor (or a step motor) 27 serving as a ratio-changing actuator or a shift actuator is connected to one end of shift control link 26. Movable flange 2b of the secondary pulley is connected to the other end of shift control link 26.

Step motor 27 is brought into a control position that is spaced from its home position by a number of steps corresponding to the target transmission gear ratio (or the desired pulley ratio). Because of this operation of step motor 27, shift control link 26 swings or oscillates about the joint (the fulcrum) to movable flange 2b. As a result of the oscillating motion of shift control link 26, shift control valve 25 is moved from its neutral position 25a to the pressure build-up position 25b or pressure reduction position 25c. Thus, primary pulley pressure Ppri is built up, using line pressure $P_L$ as a pressure source. Alternatively, primary pulley pressure Ppri is reduced, by way of pressure relief from a drain. Since the differential pressure between primary and secondary pulley pressures Ppri and Psec varies, either an upshift to a high-speed side transmission ratio or a downshift to a low-speed side transmission ratio occurs. In consequence, a gear shift is made toward the target transmission gear ratio (the target pulley ratio).

The operation of ratio changing in progress is fed back to the corresponding end of shift control link 26 via the movable flange 2b of primary pulley 2. Shift control link 26 oscillates and swings back the shift control valve 25 from either one of pressure build-up position 25b and pressure reduction position 25c toward the neutral position 25a about the joint (the fulcrum) to step motor 27. As a result of this, shift control valve 25 is returned to its neutral position 25a when the target transmission gear ratio is achieved. The target transmission gear ratio can be maintained.

CVT controller 12 determines the duty cycle of the electromagnetic solenoid of pressure regulator valve 23, the duty cycle of the electromagnetic solenoid of pressure-reducing valve 24, and an instruction given to step motor 27 regarding the number of angular steps for gear shifting. CVT controller 12 also determines whether the hydraulic pressure to be supplied to forward clutch 7b for forward-clutch engagement and the hydraulic pressure to be supplied to reverse brake 7c for reverse-brake application are fed or not, it being noted that forward clutch 7b and reverse brake 7c are shown in FIG. 1. As best seen in FIG. 2, CVT controller 12 is constructed by a pressure control section 12a and a shift control section 12b.

Pressure control section 12a determines the duty cycle of the electromagnetic solenoid of pressure regulator valve 23 and the duty cycle of the electromagnetic solenoid of pressure-reducing valve 24 in the manner described below. Shift control section 12b calculates the target transmission gear ratio I(0), as follows.

Figure 3:
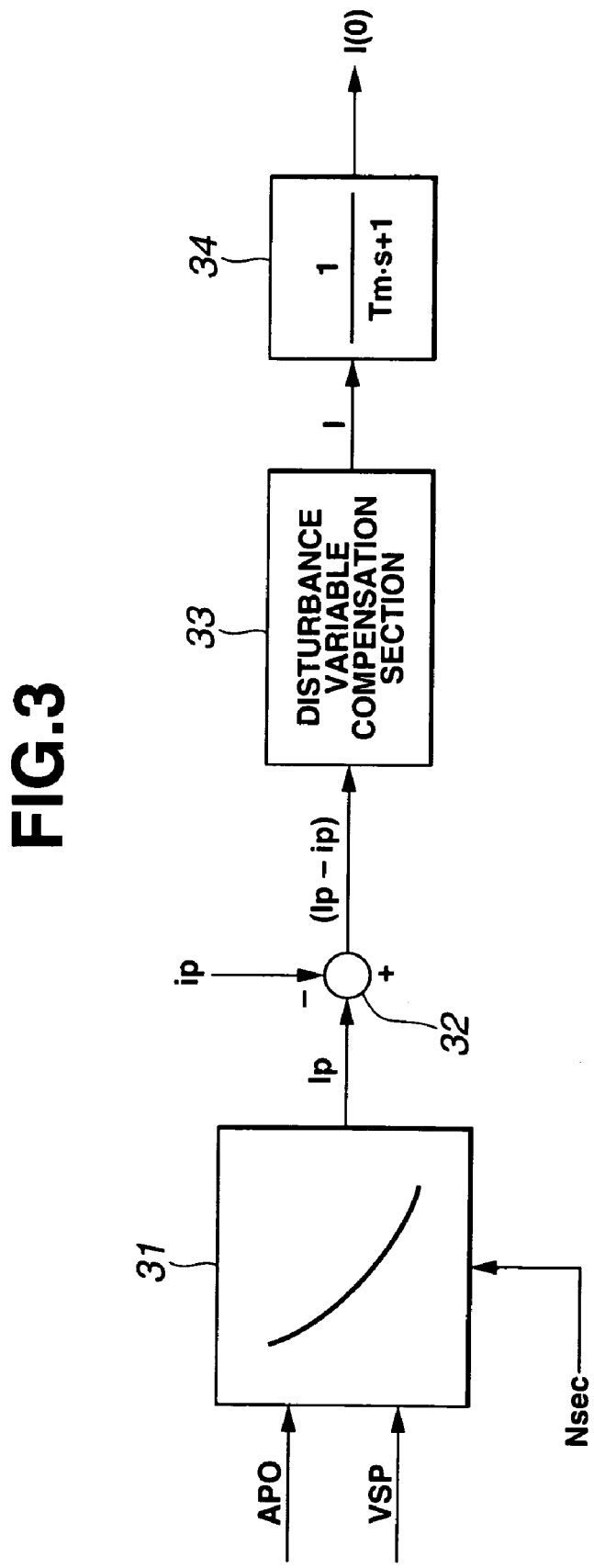
FIG. 3 is a block diagram showing a target transmission gear ratio I(0) computation process executed within a shift control section of a CVT controller.

FIG. 3 is the block diagram illustrating a method of calculating the target transmission gear ratio I(0). First, shift control section 12b computes or estimates or retrieves a target input rotational speed based on the vehicle speed VSP, which vehicle speed can be estimated or derived from the rotational speed Nsec of secondary pulley 2, and the accelerator-pedal depression amount APO, from a preprogrammed transmission gear ratio map, by means of a theoretical transmission gear ratio calculation section 31. The retrieved target input rotational speed is divided by the rotational speed Nsec of secondary pulley 3. In this way, a theoretical transmission gear ratio Ip corresponding to the engine/vehicle operating conditions, such as vehicle speed VSP and accelerator-pedal depression amount APO corresponding to the accelerator opening, is arithmetically calculated.

Thereafter, the rotational speed Npri of primary pulley 2 is divided by the rotational speed Nsec of secondary pulley 3 to thereby calculate an actual transmission gear ratio ip (=Npri/Nsec). The deviation between theoretical transmission gear ratio Ip and actual transmission gear ratio ip is computed by means of a subtracting section (or a subtracter) 32. Thereafter, for the purpose of disturbance variable compensation, theoretical transmission gear ratio Ip is compensated for by means of a disturbance variable compensation section 33. This results in a disturbance-compensated transmission gear ratio I. Within a first-order time lag filter section 34, the previously-noted disturbance-compensated transmission gear ratio I is multiplied by a first-order time lag filter $\{1/(Tm \cdot s+1)\}$, taking account of the response delay of hardware, thus computing the target transmission gear ratio I(0) (=I·$\{1/(Tm \cdot s+1)\}$). The first-order time lag filter $\{1/(Tm \cdot s+1)\}$ is found or computed or retrieved as described below.

In the case that priority is put on a downshift (high-to-low downshifting), a time constant Tm is set such that the deviation ERRstep (=Δstep1=StpMdl−Bstep) between the number of angular steps StpMdl of a reference model (described later) corresponding to the target transmission gear ratio I(0) and the number of angular steps Bstep corresponding to actual transmission gear ratio ip, which deviation ERRstep is calculated or derived by the line pressure control apparatus of the embodiment, becomes greater than the deviation Δstep2 (=Astep−Bstep) between the number of angular steps Astep of step motor 27 needed to achieve theoretical transmission gear ratio Ip and the number of angular steps Bstep corresponding to actual transmission gear ratio ip, which deviation Δstep2 is calculated or derived by the earlier line pressure control apparatus. By selecting the time constant Tm during downshifting as discussed above by means of the line pressure control apparatus of the embodiment, assuming that the accelerator pedal is slowly pushed down to accelerate the vehicle during the steady-state driving at high-speed side transmission ratios, line pressure $P_L$ increases responsively to moderate depression of the accelerator pedal. Consequently, proper primary and secondary pulley thrusts corresponding to the ratio difference between the target transmission ratio and the actual transmission ratio can be secured.

In the case that priority is put on an upshift (low-to-high upshifting), time constant Tm is set such that the deviation ERRstep (=Δstep1=StpMdl−Bstep) between reference-model number-of-steps StpMdl corresponding to target transmission gear ratio I(0) and actual-transmission-ratio related number-of-steps Bstep corresponding to actual transmission gear ratio ip, which deviation ERRstep (=Δstep1) is calculated or derived by the line pressure control apparatus of the embodiment, becomes less than the deviation Δstep2 (=Astep−Bstep) between theoretical-transmission-ratio related number-of-steps Astep of step motor 27 needed to achieve theoretical transmission gear ratio Ip and actual-transmission-ratio related number-of-steps Bstep, which deviation Δstep2 is calculated or derived by the earlier line pressure control apparatus. Selecting the time constant Tm during upshifting as discussed above by means of the line pressure control apparatus of the embodiment, effectively prevents line pressure $P_L$ from being unnecessarily built up, thus realizing further improved fuel economy (further reduced fuel consumption rate).

Taking account of the harmony with the operation and effects based on selection of time constant Tm during downshifting, time constant Tm has to be selected or set to balance both of the operation and effects provided during downshifting and the operation and effects provided during upshifting.

Figure 5:
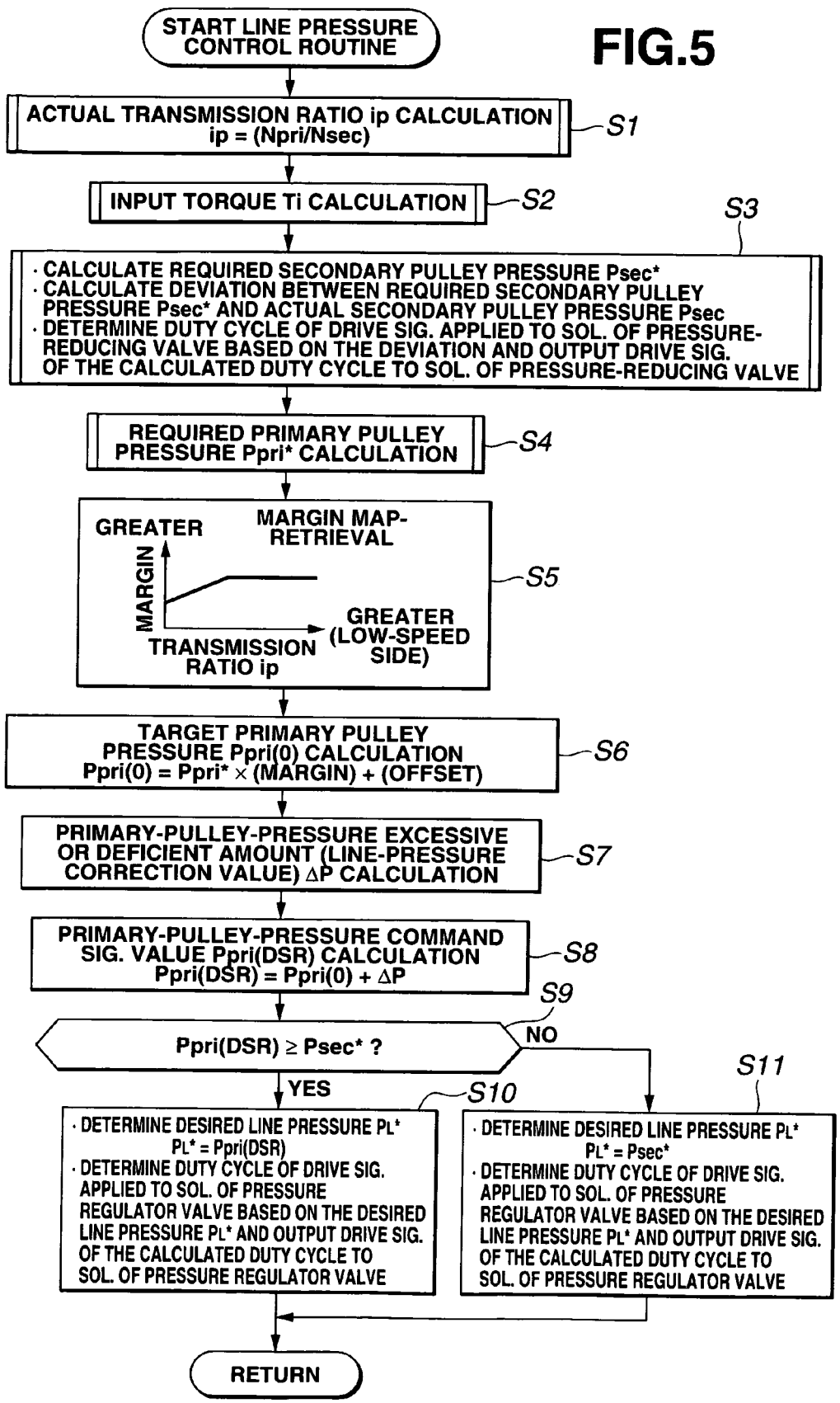
FIG. 5 is a flow chart showing a line pressure control program executed within a pressure control section of the CVT controller of the line pressure control apparatus of the embodiment.

The arithmetic and logic processing (or the line pressure control program) executed within pressure control section 12a are described in detail in reference to the flow chart shown in FIG. 5. The line pressure control routine of FIG. 5 is executed as time-triggered interrupt routines to be triggered every predetermined sampling time intervals such as 10 milliseconds.

First, in step S1, the rotational speed Npri of primary pulley 2 is divided by the rotational speed Nsec of secondary pulley 3 to calculate or derive actual transmission gear ratio ip.

In the next step S2, transmission input torque Ti is calculated based on input information (such as engine RPM and fuel injection time length) output from engine controller 19 (see FIG. 1) and related to the input torque.

Figure 6:
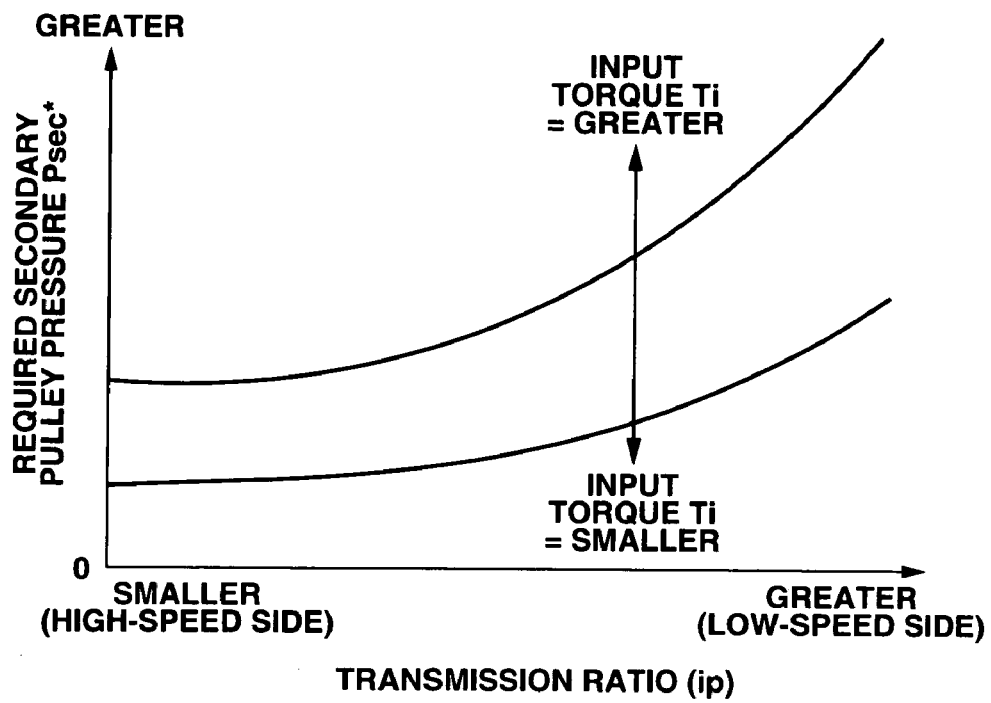
FIG. 6 is a preprogrammed transmission input torque Ti versus transmission ratio ip versus required secondary pulley pressure Psec* characteristic map.

In the next step S3, a required secondary pulley pressure Psec* is calculated or retrieved based on the actual transmission gear ratio ip and transmission input torque Ti from the preprogrammed input torque Ti versus transmission ratio ip versus required secondary pulley pressure Psec* characteristic map shown in FIG. 6. Feedback control is executed based on the deviation |Psec*−Psec| between actual secondary pulley pressure Psec detected by secondary pulley pressure sensor 15 and required secondary pulley pressure Psec*. Thus, a duty cycle of the drive signal applied to pressure-reducing valve 24 is determined so that actual secondary pulley pressure Psec is brought closer to required secondary pulley pressure Psec*, by way of feedback control based on the deviation |Psec*−Psec|. The drive signal of the determined duty cycle is output from the output interface circuitry of the CVT controller to the solenoid 24a of pressure-reducing valve 24.

The line pressure control executed according to the apparatus of the present embodiment and illustrated in step S4 et seq. is described below.

Figure 7:
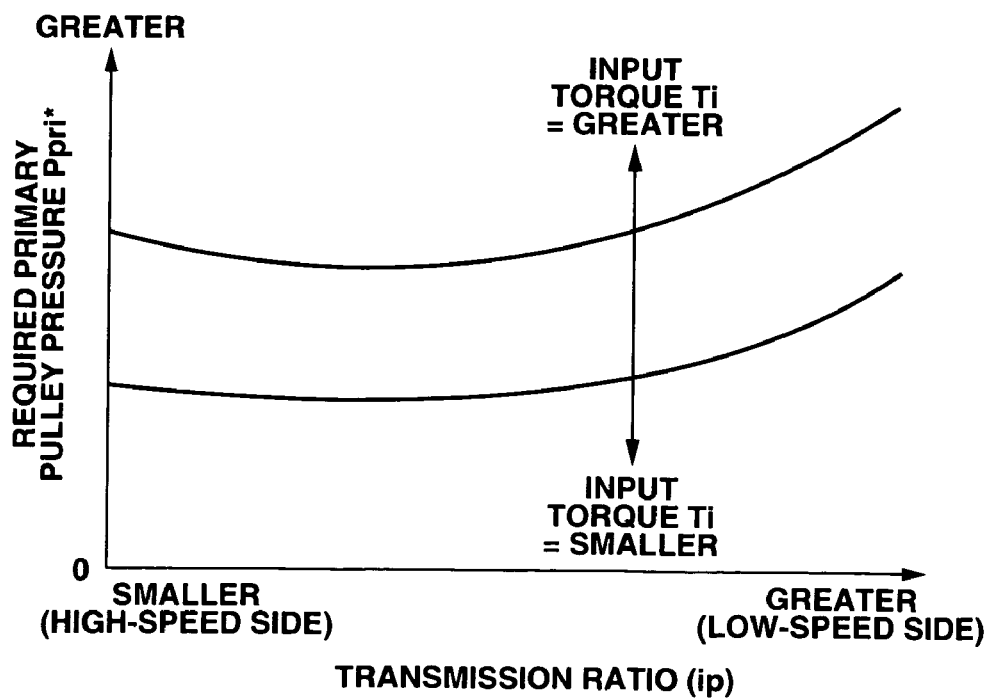
FIG. 7 is a preprogrammed transmission input torque Ti versus transmission ratio ip versus required primary pulley pressure Ppri* characteristic map.

At step S4, required primary pulley pressure Ppri* is calculated based on actual transmission gear ratio ip and transmission input torque Ti from the preprogrammed input torque Ti versus transmission ratio ip versus required primary pulley pressure Ppri* characteristic map shown in FIG. 7.

Thereafter, at step S5, a margin (or an allowance factor) to be set for the primary pulley pressure is calculated or retrieved based on actual transmission gear ratio ip from a preprogrammed actual transmission ratio ip versus primary-pulley-pressure margin characteristic map, fully taking account of the pressure loss in shift control valve 25.

At step S6, required primary pulley pressure Ppri* is multiplied by the map-retrieved margin. An amount of offset giving a safety margin is further added to the product of required primary pulley pressure Ppri* and the map-retrieved margin. In this manner, a target primary pulley pressure Ppri (0) is calculated as the summed value of the safety margin (the predetermined offset) and the previously-noted product of required primary pulley pressure Ppri* and the map-retrieved margin.

Figure 8:
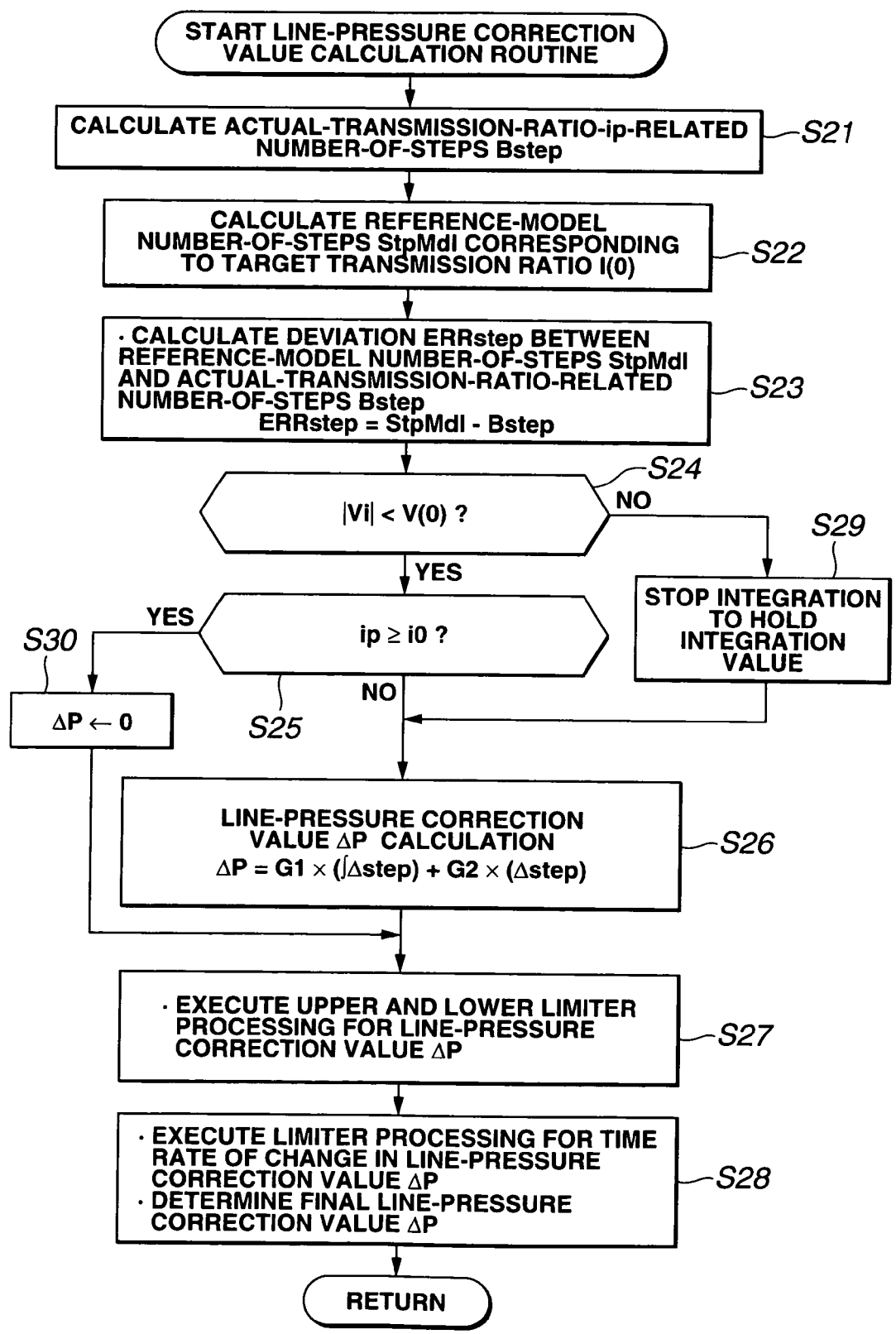
FIG. 8 is a flow chart showing a sub-routine of arithmetic and logic processing for line-pressure correction value ΔP, related to step S7 of FIG. 5.
Figure 9:
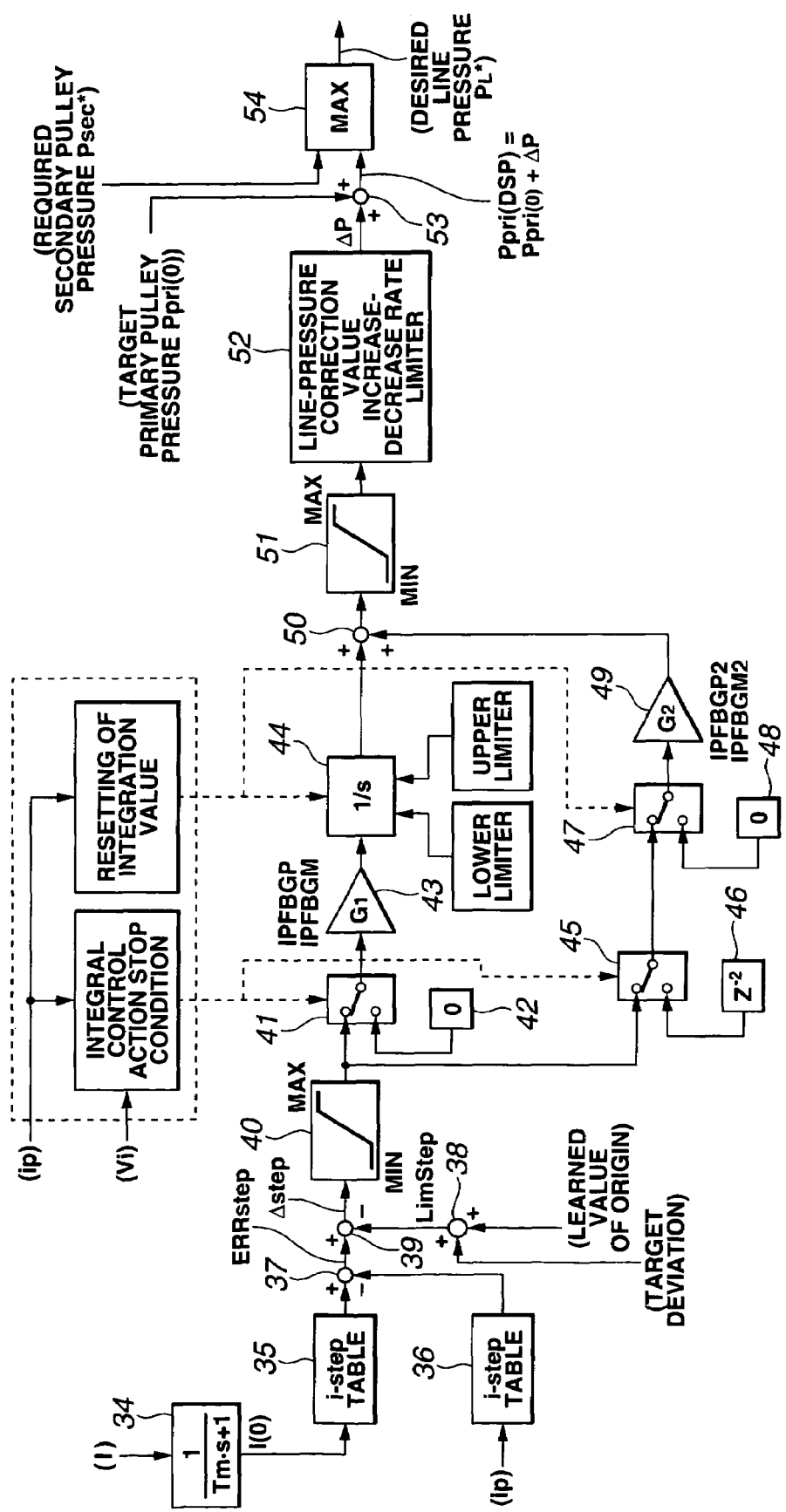
FIG. 9 is a block diagram showing a detailed line-pressure correction value ΔP calculation process.

Then, at step S7, an excessive or deficient amount of primary pulley pressure (an amount of correction to line pressure $P_L$, simply "line-pressure correction value") ΔP is calculated or computed as illustrated in FIGS. 8 and 9.

Referring now to FIG. 8, there is shown the line-pressure correction value ΔP calculation sub-routine (related to step S7 of FIG. 5). The sub-routine of FIG. 8 is also executed as time-triggered interrupt routines to be triggered every predetermined sampling time intervals such as 10 milliseconds.

At step S21, the number of steps which should be present for step motor 27 at actual transmission gear ratio ip, that is, actual-transmission-ratio related number-of-steps Bstep (in other words, the control position of step motor 27 corresponding to actual transmission gear ratio ip) is calculated or estimated based on actual transmission gear ratio ip by way of conversion calculation opposite to the calculation performed during shift control or during ratio-changing control.

Thereafter, at step S22, the reference-model number-of-steps StpMdl corresponding to target transmission gear ratio I(0) is calculated. Reference-model number-of-steps StpMdl is calculated based on target transmission gear ratio I(0) by way of conversion calculation opposite to the calculation performed during shift control in a similar manner to step S21.

At step S23, the deviation ERRstep (=StpMdl−Bstep) between reference-model number-of-steps StpMdl and actual-transmission-ratio related number-of-steps Bstep is calculated. Thereafter, the sub-routine proceeds from step S23 to step S24.

At step S24, a check is made to determine whether a time rate of change Vi of actual transmission gear ratio ip, in other words, ratio-changing speed or shifting speed, is less than a reference set value V(0). When the answer to step S24 is in the affirmative (YES), in other words, when the time rate of change Vi of actual transmission gear ratio ip is relatively low and less than reference set value V(0), that is, |Vi|<V(0), the routine proceeds from step S24 to step S25. Conversely when the answer to step S24 is in the negative (NO), in other words, when the time rate of change Vi of actual transmission gear ratio ip is relatively high and greater than or equal to reference set value V(0), that is, |Vi|≧V(0), the routine proceeds from step S24 to step S29.

At step S25, a further check is made to determine whether actual transmission gear ratio ip is greater than or equal to a reference set value i0 (e.g., i0=1.0) corresponding to a low-speed side transmission gear ratio, that is, ip≧i0. When the answer to step S25 is negative (NO), in other words, when the current value of actual transmission gear ratio ip corresponds to a high-speed side transmission gear ratio less than i0, that is, ip<i0, the routine proceeds from step S25 to step S26. Conversely when the answer to step S25 is affirmative (YES), in other words, when the current value of actual transmission gear ratio ip corresponds to a low-speed side transmission gear ratio greater than or equal to i0, that is, ip≧i0, the routine proceeds from step S25 to step S30.

At step S26, the difference (ERRstep−LimStep), obtained by subtracting an allowed deviation LimStep from the deviation ERRstep (=StpMdl−Bstep) between reference-model number-of-steps StpMdl and actual-transmission-ratio related number-of-steps Bstep, in other words, the positional deviation Δstep (=ERRstep−LimStep) of step motor 27 exceeding the allowed deviation LimStep, is integrated. The integration value {∫Δstep=∫(ERRstep−LimStep)} obtained by way of integration is multiplied by a first gain G1 of a unit system, which gain G1 is used to convert the number of steps of step motor 27 into a primary pulley pressure. The resulting product $\{(integral \int \Delta step) \times (1^{st} gain\ G1)\}$ is herein referred to as the first product $G1 \times (\int \Delta step)$. The positional deviation $\Delta step$ (=ERRstep−LimStep) of step motor 27 is multiplied by a second gain G2 of a unit system, which gain G2 is used to convert the number of steps of step motor 27 into a primary pulley pressure. The resulting product $\{(positional\ deviation\ \Delta step) \times (2^{nd}\ gain\ G2)\}$ is herein referred to as the second product $G2 \times (\Delta step)$. The first and second products $G1 \times (\int \Delta step)$ and $G2 \times (\Delta step)$ are summed up. From the summed value $G1 \times (\int \Delta step) + G2 \times (\Delta step)$ of the first and second products, the excessive or deficient amount of primary pulley pressure (the line-pressure correction value) $\Delta P$ is derived from the sum $G1 \times (\int \Delta step) + G2 \times (\Delta step)$, that is, $\Delta P = G1 \times (\int \Delta step) + G2 \times (\Delta step)$.

Figure 15:
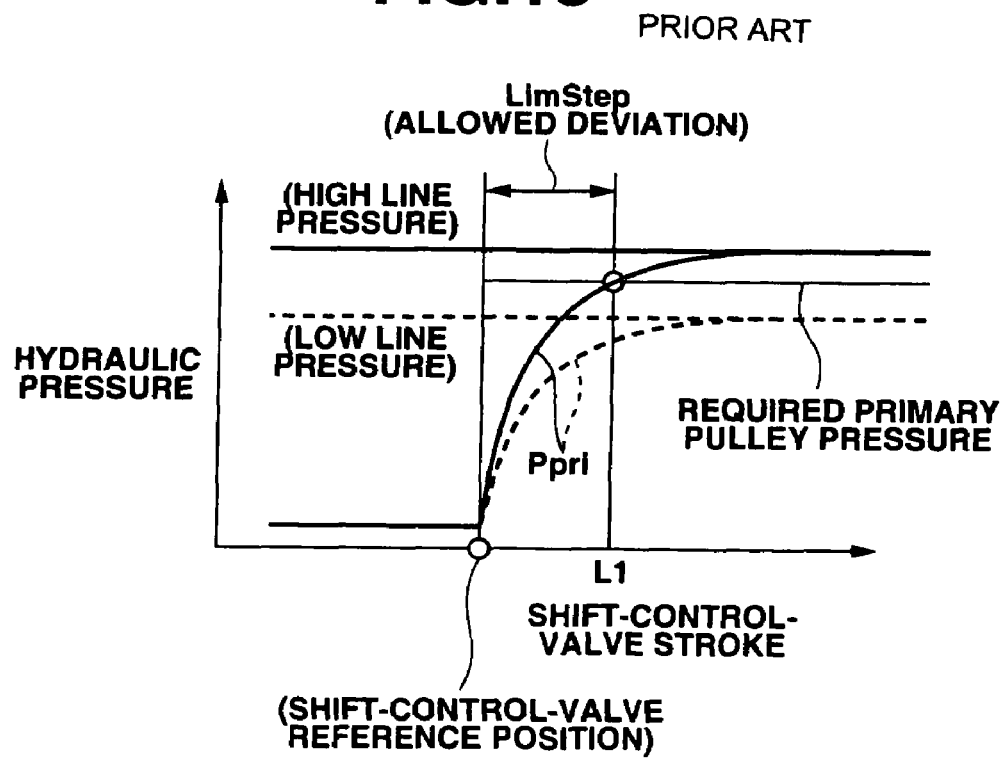
FIG. 15 is a time chart, according to the prior art, explaining the phenomenon (see the broken line) that the highest transmission ratio (the highest pulley ratio) is not achieved owing to the deficient line pressure and the operating mode (see the solid line) where the highest transmission ratio is satisfactorily achieved by the normal line pressure.

This amount of allowed deviation LimStep is the summed value of a target deviation for correcting the deviation of the number of steps accumulated from the start of operation of step motor 27 and a learned value of the origin obtained by learning. In particular, if a steady-state driving condition without any shift (without any downshift or without any upshift) persists for a given time in order to correct variations in the accuracy at which step motor 27 is installed or mounted as a hardware unit, the learned value of the origin concerning the angular position of step motor 27 is obtained by learning the amount of deviation in that condition. Allowed deviation LimStep is determined in relation to the required primary pulley pressure, for example, as shown in FIG. 15.

At steps 27 and 28, a final excessive or deficient amount of primary pulley pressure (a final line-pressure correction value) $\Delta P$ is determined, while limiting the excessive or deficient amount of primary pulley pressure (the line-pressure correction value) $\Delta P$ to within upper and lower limits and also limiting the rate of change of the excessive or deficient amount of primary pulley pressure (the line-pressure correction value) $\Delta P$ with respect to time.

If the decision of step S24 is that the time rate of change Vi of actual transmission gear ratio ip, i.e., shifting speed is relatively high and in excess of reference set value V(0), the aforementioned integration and multiplication operations are stopped in step S29. Thereafter, the routine flows from step S29 to step S26, while maintaining or holding the integration value and product values. If the decision of step S25 is that actual transmission gear ratio ip is a low-speed side transmission ratio greater than or equal to reference set value i0, the excessive or deficient amount of primary pulley pressure (the line-pressure correction value) $\Delta P$ is reset to zero (i.e., $\Delta P \leftarrow 0$) in step S30. Thereafter, the routine proceeds from step S30 to step S27.

FIG. 9 is a block diagram form of the line-pressure correction value $\Delta P$ calculation sub-routine shown in FIG. 8. Referring to the block diagram of FIG. 9, the previously-noted reference-model number-of-steps StpMdl, corresponding to target transmission gear ratio I(0) obtained through first-order time lag filter section 34, is, first of all, calculated based on target transmission gear ratio I(0) by means of a reference model step number calculation section 35 by way of conversion calculation opposite to the calculation performed during shift control. At the same time, the previously-noted actual-transmission-ratio related number-of-steps Bstep is calculated based on actual transmission gear ratio ip by means of an actual-transmission-ratio-related number-of-steps calculation section 36 by way of conversion calculation opposite to the calculation performed during shift control. Then, a subtracting section (or a subtracter) 37 calculates the deviation ERRstep (=StpMdl−Bstep) between reference-model number-of-steps StpMdl and actual-transmission-ratio related number-of-steps Bstep.

Meanwhile, an adding section (or an adder) 38 sums up the target deviation and the learned value of the origin obtained by learning to thereby calculate or derive the previously-noted allowed deviation LimStep. A subtracting section (or a subtracter) 39 subtracts the allowed deviation LimStep from the deviation ERRstep (=StpMdl−Bstep), thus calculating the positional deviation $\Delta step$ (=ERRstep−LimStep) of step motor 27 exceeding allowed deviation LimStep. A positional deviation upper-lower limit value limiter 40 limits the upper and lower limits of positional deviation $\Delta step$ to facilitate calculations performed later. The limited value is applied to one input of an integral-control-action decision device 41 and to one input of a proportional-control-action decision device 45.

Integral-control-action decision device 41 selects a gain multiplier 43 to perform an integral control action based on the positional deviation $\Delta step$ (=ERRstep−LimStep) from the aforementioned one input while shifting speed Vi is low and less than reference set value Vi(0). Conversely, integral-control-action decision device 41 selects a zero-input section 42 to hold the integration value while shifting speed Vi is high and in excess of reference set value Vi(0).

In the case that integral-control-action decision device 41 selects the positional deviation upper-lower limit value limiter 40, gain multiplier 43 multiplies the positional deviation $\Delta step$ (=ERRstep−LimStep) by the $1^{st}$ gain G1 of the unit system so as to convert the number of steps of step motor 27 into a primary pulley pressure. Positional deviation $\Delta step$ is multiplied by the $1^{st}$ gain G1, resulting in a product IPFBGP (=$\Delta step \times G1$). This product IPFBGP ($\Delta step \times G1$) is integrated by an integrator 44 to produce the integration value $G1 \times (\int \Delta step)$. In the present embodiment, integrator 44 limits its output integration value to within the upper and lower limits. On the contrary, in the case that the integral-control-action decision device 41 selects the zero-input portion 42, the output value IPFBGP generated from gain multiplier 43 becomes zero (IPFBGP=0) and so the output from integrator 44 also becomes zero.

When shifting speed Vi is low and less than reference set value Vi(0), proportional-control-action decision device 45 selects a proportional-control-action resetting decision device 47 to perform a proportional control action based on the positional deviation $\Delta step$ from the aforementioned one input. When shifting speed Vi is high and in excess of reference set value Vi(0), proportional-control-action decision device 45 selects a feedback section 46 to maintain the positional deviation $\Delta step$.

When actual transmission gear ratio ip is a high-speed side transmission ratio less than or equal to reference set value io, proportional-control-action resetting decision device 47 selects a gain multiplier 49. Conversely when actual transmission gear ratio ip is a low-speed side transmission ratio and greater than reference set value io, proportional-control-action resetting decision device 47 selects a zero-input section 48 to perform resetting.

When proportional-control-action resetting decision device 47 selects the proportional-control-action decision device 45, gain multiplier 49 multiplies the positional deviation $\Delta step$ by the $2^{nd}$ gain G2 of the unit system so as to convert the number of steps of step motor 27 into a primary pulley pressure, resulting in the product IPFBGP2 (=$\Delta step \times G2$). This product $G2 \times (\Delta step)$ is output to an adding section (or an adder) 50. On the contrary, when proportional-control-action resetting decision device 47 selects the zero-input portion 48, the output from proportional-control-action resetting decision device 47 becomes zero. Therefore, the output value IPFBGM2 from gain multiplier 49 also becomes zero.

In this way, when shifting speed Vi is low and less than reference set value Vi(0), integral control action and proportional control action are both provided or executed. Adder 50 sums up the integration value from integrator 44 and the product from gain multiplier 49, and whereby the excessive or deficient amount of primary pulley pressure (the line-pressure correction value) ΔP is calculated as the summed value of the integration value from integrator 44 and the product from gain multiplier 49. Conversely when shifting speed vi is high and in excess of reference set value Vi(0), the integration value from integrator 44 and the product from gain multiplier 49 remain the same as their previous values. Therefore, the excessive or deficient amount of primary pulley pressure (the line-pressure correction value) ΔP remains unchanged.

When actual transmission gear ratio ip is a high-speed side transmission ratio less than or equal to reference set value i0, integral control action and proportional control action are both performed. Adder 50 sums up the integration value from integrator 44 and the product from gain multiplier 49 to thereby calculate the excessive or deficient amount of primary pulley pressure (the line-pressure correction value) ΔP as the summed value of the integration value from integrator 44 and the product from gain multiplier 49. Conversely when actual transmission gear ratio ip is a low-speed side transmission ratio exceeding reference set value i0, neither integral control action nor proportional control action is performed. Thus, the excessive or deficient amount of primary pulley pressure (the line-pressure correction value) ΔP becomes zero.

Furthermore, in the present embodiment, upper and lower limits of the excessive or deficient amount of primary pulley pressure (the line-pressure correction value) ΔP are limited by means of a line-pressure correction value upper-lower limit value limiter 51. In addition, the time rate of change of the excessive or deficient amount of primary pulley pressure (the line-pressure correction value) ΔP is limited by means of a line-pressure correction value increase-decrease rate limiter 52. Under these limitations, a final line-pressure correction value ΔP is computed or derived.

After calculation of the excessive or deficient amount of primary pulley pressure (the line-pressure correction value) ΔP as described above in reference to FIGS. 5-8, the excessive or deficient amount of primary pulley pressure (the line-pressure correction value) ΔP calculated through step S7 of FIG. 5 is added to target primary pulley pressure Ppri(0) calculated through step S6, giving rise to a primary-pulley-pressure command signal value Ppri(DSR), which is the summed value (Ppri(0)+ΔP) (see step S8 of FIG. 5).

Then, at step S9 of FIG. 5, primary-pulley-pressure command signal value Ppri(DSR) is compared with required secondary pulley pressure Psec*. A decision is made as to which of primary pulley pressure Ppri and secondary pulley pressure Psec might interfere with line pressure $P_L$ in a case where line pressure $P_L$ is suppressed, taking account of improved fuel economy. Belt-drive CVT 1; to which the line pressure control apparatus of the embodiment can be applied, makes an upshift (low-to-high upshifting) under conditions where primary pulley pressure Ppri>secondary pulley pressure Psec and makes a downshift (high-to-low downshifting) under conditions where primary pulley pressure Ppri<secondary pulley pressure Psec, as is obvious from FIG. 1.

At step S9 of FIG. 5, when primary-pulley-pressure command signal value Ppri(DSR) is higher than or equal to required secondary pulley pressure Psec*, it is determined that primary pulley pressure Ppri is on the high-pressure side and might interfere with line pressure $P_L$ In the case of Ppri (DSR)≧Psec*, the routine proceeds from step S9 to step S10.

At step S10, a target line pressure $P_L$* is set to the same value as primary-pulley-pressure command signal value Ppri (DSR). A duty cycle of drive signal to be applied to solenoid 23a of pressure regulator valve 23 is determined based on target line pressure $P_L$* (=Ppri(DSR)). And then, the drive signal of the duty cycle determined based on target line pressure $P_L$* (=Ppri(DSR)) is output to solenoid 23a of pressure regulator valve 23. Responsively to the drive signal of the calculated duty cycle, target line pressure $P_L$* becomes equal to a corrected target primary pressure value, which is obtained by correcting target primary pressure value Ppri by the line-pressure correction value ΔP. In this manner, line pressure correction is made.

On the contrary, when the answer to step S9 is in the negative (NO), that is, when primary-pulley-pressure command signal value Ppri(DSR) is less than required secondary pulley pressure Psec*, it is determined that secondary pulley pressure Psec is on the low-pressure side and might interfere with line pressure $P_L$. In the case of Ppri(DSR)<Psec*, the routine proceeds from step S9 to step S11.

At step S11, target line pressure $P_L$* is set to the same value as required secondary pulley pressure Psec*; A duty cycle of drive signal to be applied to solenoid 23a of pressure regulator valve 23 is determined based on target line pressure $P_L$* (=Psec*). And then, the drive signal of the duty cycle determined based on target line pressure $P_L$* (=Psec*) is output to solenoid 23a of pressure regulator valve 23. Responsively to the drive signal of the calculated duty cycle, target line pressure $P_L$* becomes equal to required secondary pulley pressure Psec*. In this manner, any line pressure correction is not made.

The arithmetic and logic processing executed through steps S8 to S11 of FIG. 5 can also be represented in the block diagram of the rear part of FIG. 9. The excessive or deficient amount of primary pulley pressure (the line-pressure correction value) ΔP is added to target primary pulley pressure Ppri(0) by means of an adding section (or an adder) 53. Thus, primary-pulley-pressure command signal value Ppri(DSR) is calculated as the summed value (Ppri(0)+ΔP). A higher one selector (or a select-HIGH processor) 54 selects a higher one of primary-pulley-pressure command signal value Ppri(DSR) and required secondary pulley pressure Psec* by way of select-HIGH processing MAX(Ppri(DSR), Psec*). Target line pressure $P_L$* is set to the same value as the selected value MAX(Ppri(DSR), Psec*) and used for line pressure control.

According to the line pressure control described so far, line pressure $P_L$ is corrected according to the deviation ERRstep (=StpMdl−Bstep) between reference-model number-of-steps StpMdl and actual-transmission-ratio related number-of-steps Bstep (step-motor control position corresponding to actual transmission gear ratio ip) so as to reduce the positional deviation Δstep (=ERRstep−LimStep) between the control positions computed.

Specific operations of the line pressure control apparatus of the shown embodiment are hereunder described.

Figure 10:
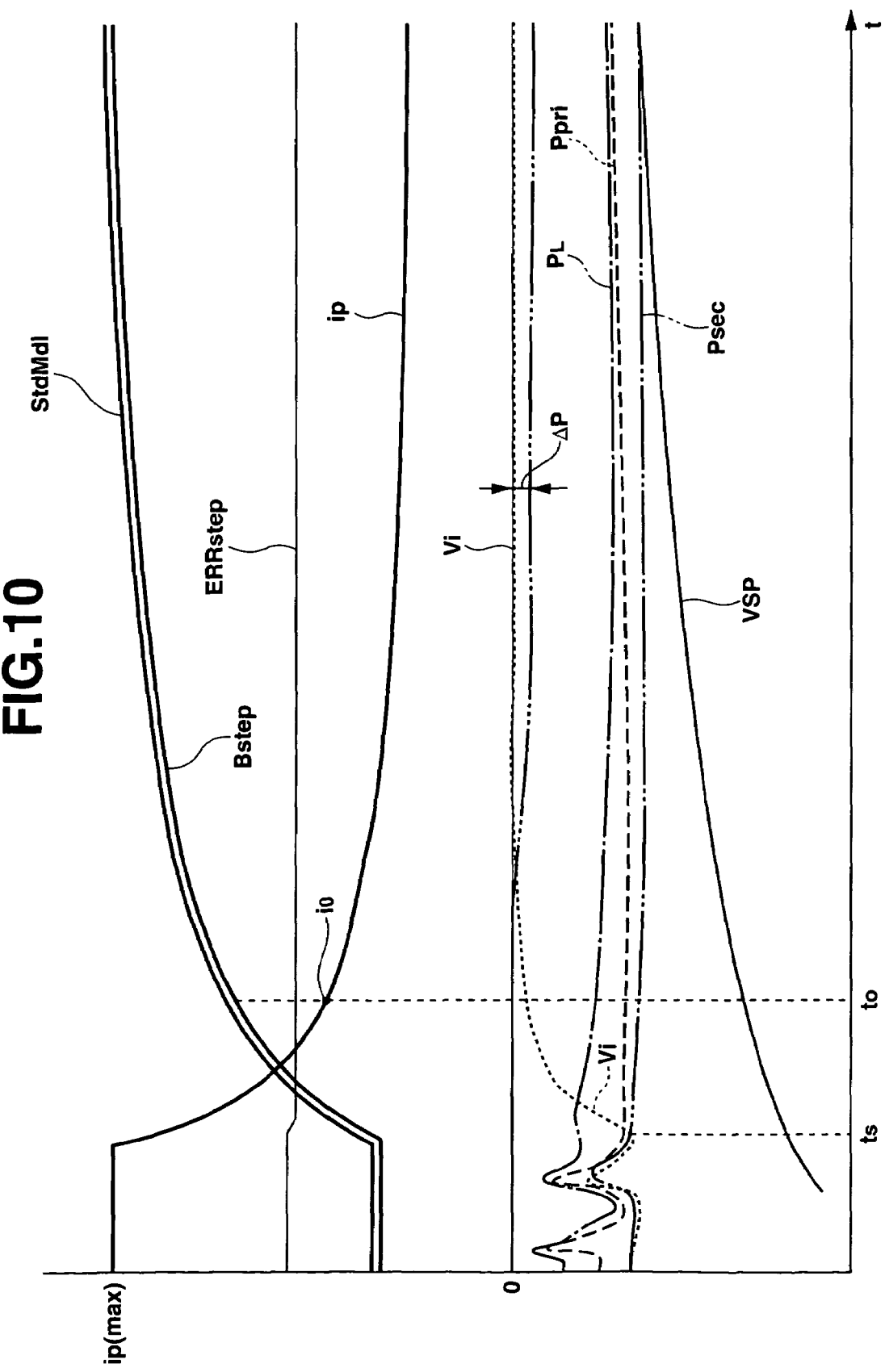
FIG. 10 is a time chart showing the operation of the line pressure control apparatus of the embodiment during automatic upshifting executed based on engine/vehicle operating conditions, including at least an accelerator opening APO and vehicle speed VSP, at the startup period.
Figure 11:
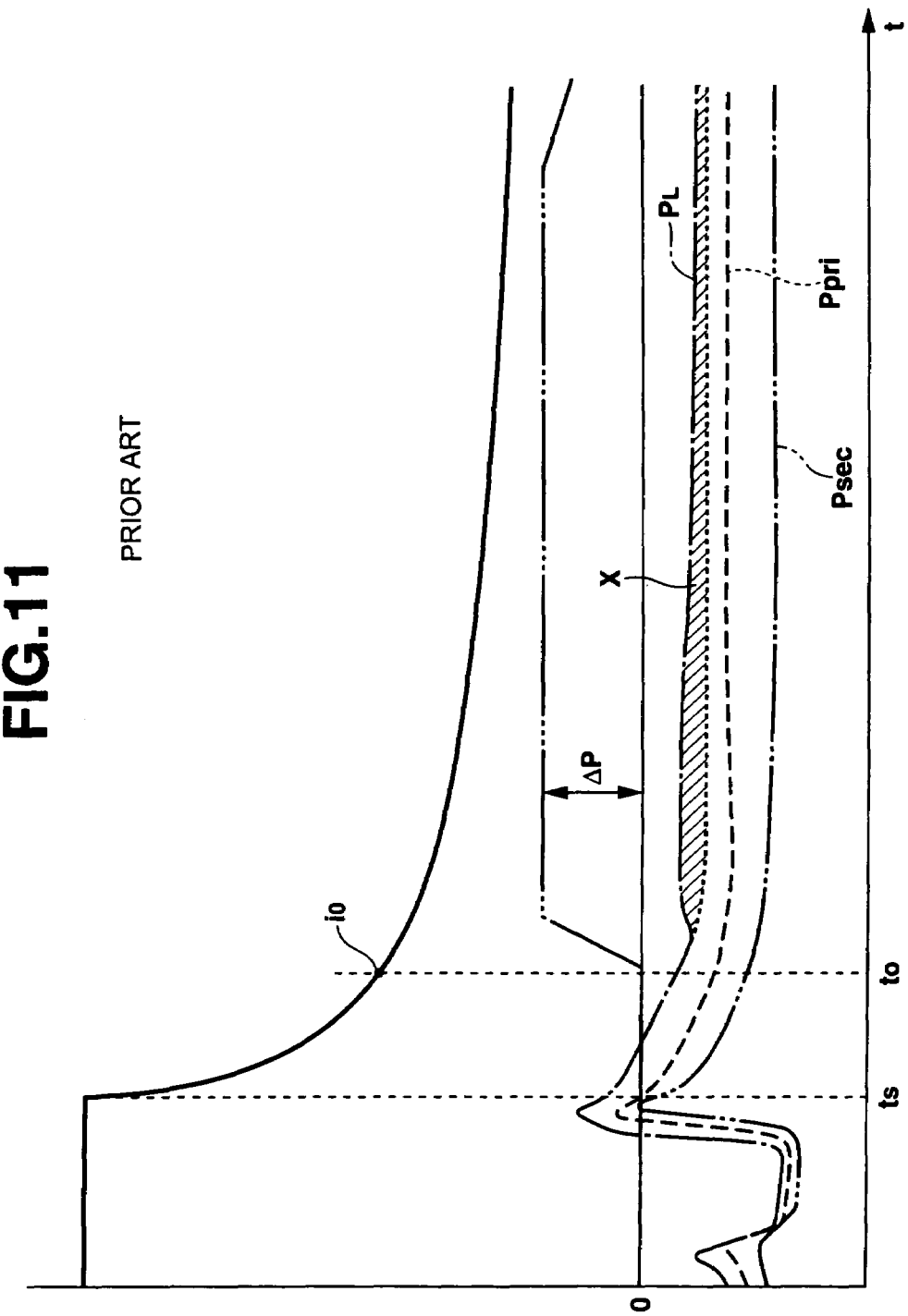
FIG. 11 is a time chart, according to the prior art, showing the operation of the earlier line pressure control apparatus during automatic upshifting executed based on engine/vehicle operating conditions, including at least an accelerator opening APO and vehicle speed VSP, at the startup period.

FIG. 10 is the time chart illustrating the operation of the line pressure control apparatus of the embodiment. On the other hand, FIG. 11 is the time chart illustrating the operation of the earlier line pressure control apparatus. In FIGS. 10 and 11, the apparatus of the present embodiment and the earlier line pressure control apparatus are compared during automatic upshifting executed based on engine/vehicle operating conditions, including at least accelerator opening APO and vehicle speed VSP, at the startup period.

At startup, a shift is made toward the high-speed side where actual transmission gear ratio ip decreases gradually. Therefore, in the apparatus of the present embodiment, as shown in FIG. 10, the line pressure correction is not initiated as long as actual transmission gear ratio ip is in excess of reference set value i0. However, when actual transmission gear ratio ip reaches reference set value i0 at instant t=t0, the excessive or deficient amount of primary pulley pressure (the line-pressure correction value) ΔP assumes a negative value within the range in which line pressure $P_L$ does not interfere with primary pulley pressure Ppri. As a result, as shown in FIG. 10, line pressure $P_L$ can be suppressed without interference with primary pulley pressure Ppri.

On the other hand, in the earlier line pressure control apparatus, when actual transmission gear ratio ip reaches reference set value i0 at instant t=t0, the excessive or deficient amount of primary pulley pressure (the line-pressure correction value) ΔP assumes a positive value to prevent primary pulley pressure Ppri from interfering with line pressure $P_L$ as shown in FIG. 11. Consequently, line pressure $P_L$ is increased by an extra amount corresponding to a portion indicated by the right-hand diagonal shading area X in FIG. 11. There remains room for improvement of fuel economy.

Figure 12:
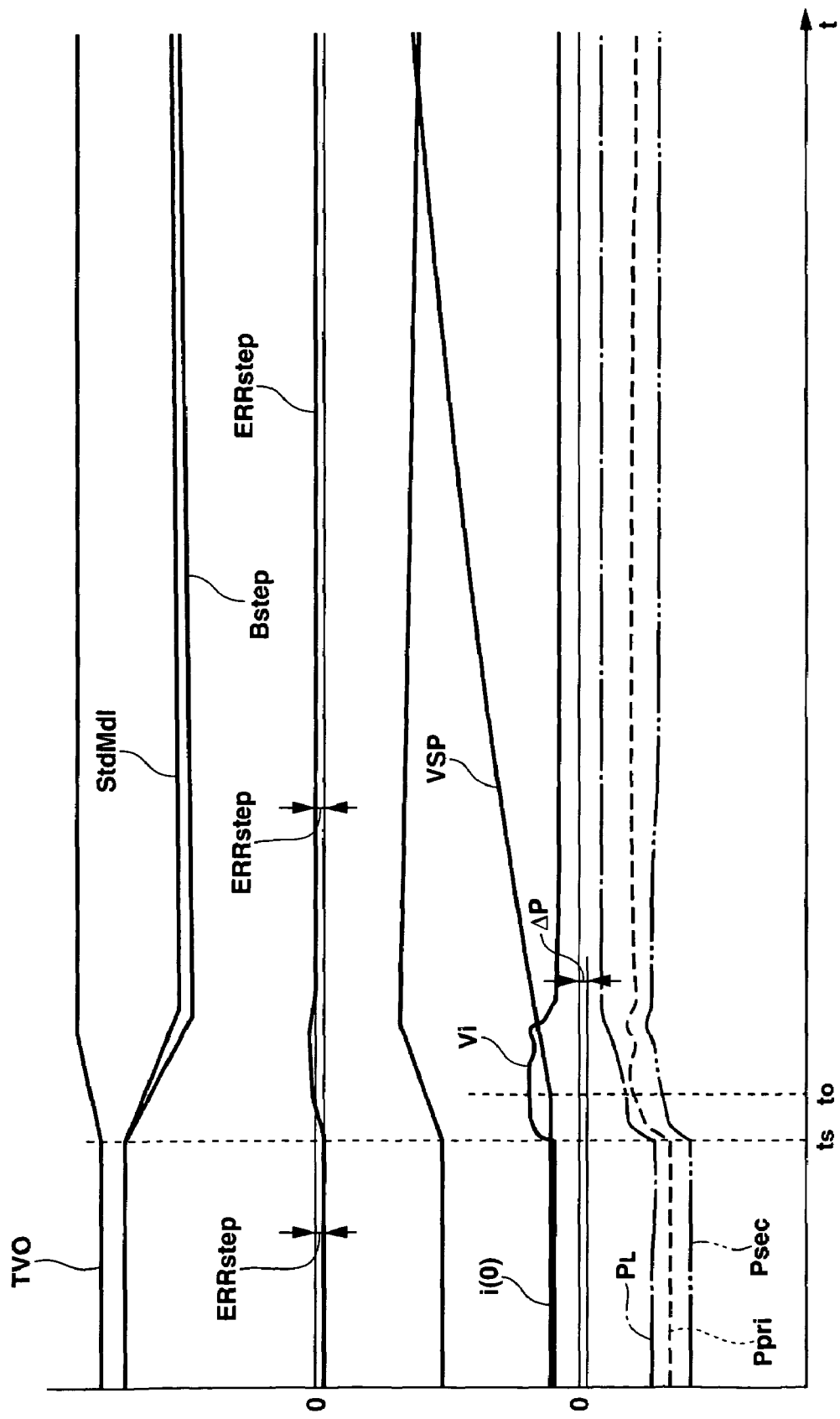
FIG. 12 is a time chart showing the operation of the line pressure control apparatus of the embodiment when the vehicle is accelerated with moderate depression of the accelerator pedal during the steady-state driving at high-speed side transmission gear ratios.
Figure 13:
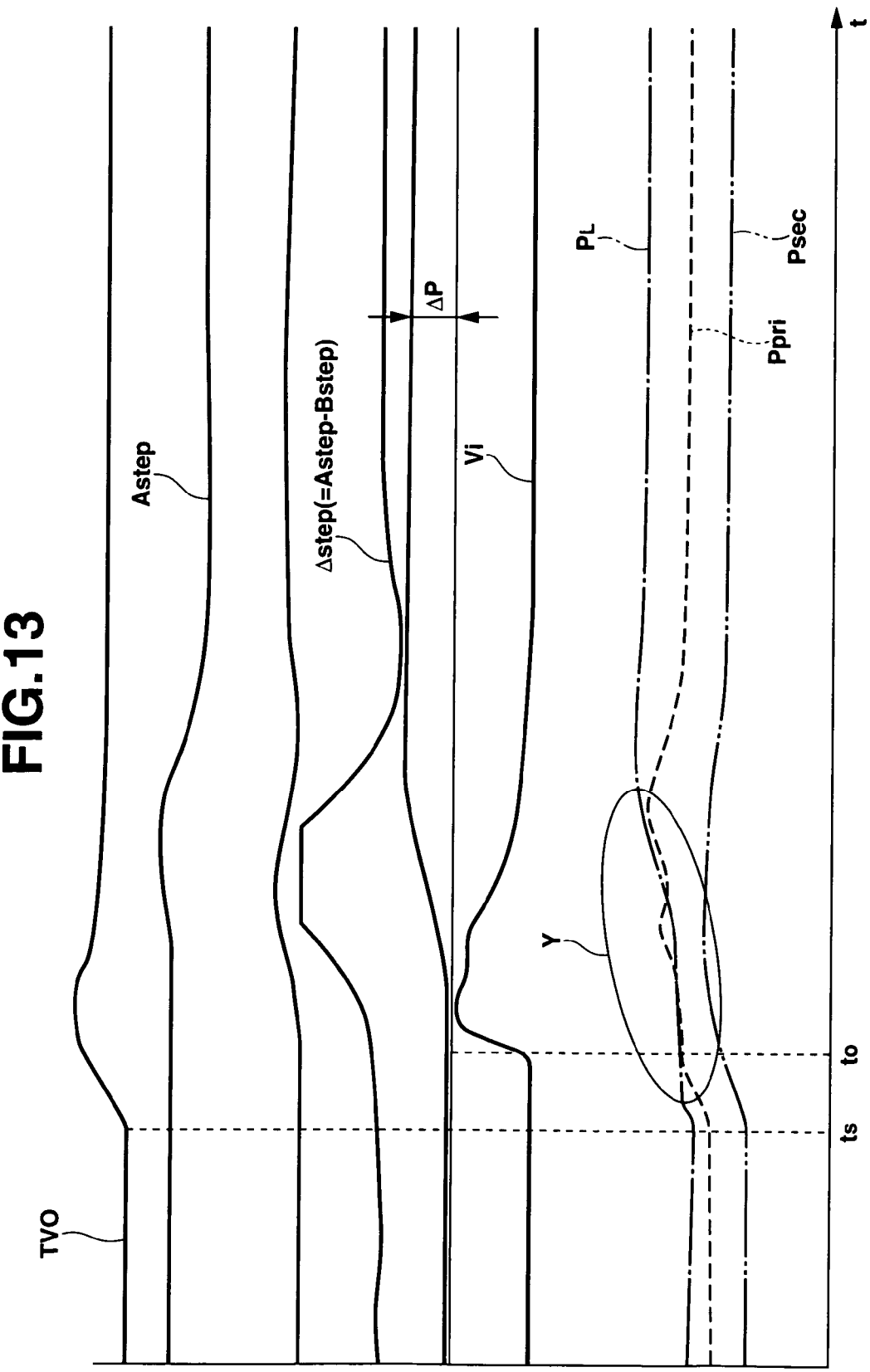
FIG. 13 is a time chart showing the operation of the earlier line pressure control apparatus when the vehicle is accelerated with moderate depression of the accelerator pedal during the steady-state driving at high-speed side transmission gear ratios.
Figure 14:
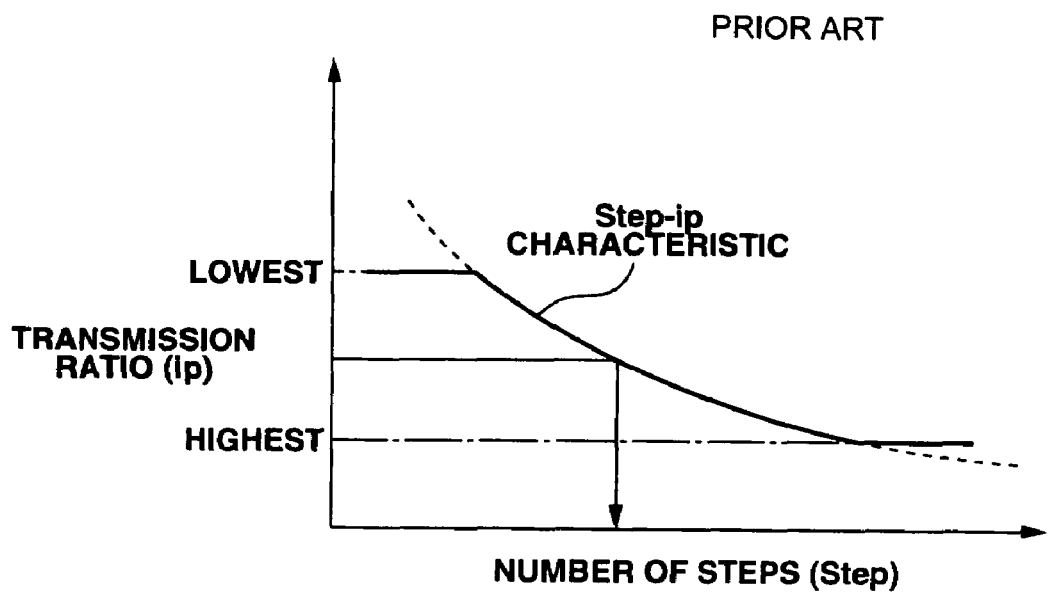
FIG. 14 is a preprogrammed angular steps Step versus transmission ratio ip characteristic diagram, according to the prior art, under a normal line pressure condition.

FIG. 12 is the time chart illustrating the operation of the line pressure control apparatus of the embodiment. FIG. 13 is the time chart illustrating the operation of the earlier line pressure control apparatus. In FIGS. 12 and 13, the apparatus of the present embodiment and the earlier line pressure control apparatus are compared in cases where the accelerator pedal is slowly pushed down to accelerate the vehicle during the steady-state driving at high-speed side transmission gear ratios.

When the accelerator pedal is slowly depressed during the steady-state high-speed driving, actual transmission gear ratio ip still remains kept at the high-speed side transmission gear ratio until the pedal is started to be pushed down at instant ts. Therefore, in the apparatus of the embodiment, as shown in FIG. 12, the line pressure correction is made to assume a negative value (ΔP<0) such that line pressure $P_L$ is suppressed without interference with the pulley pressures. However, when a given time has passed at instant t=t0 since the instant ts of the start of accelerator-pedal depression, the excessive or deficient amount of primary pulley pressure (the line-pressure correction value) ΔP assumes a positive value. Since the deviation ERRstep (=StpMdl−Bstep) between reference-model number-of-steps StpMdl and actual-transmission-ratio related number-of-steps Bstep is small, the increment by which line-pressure correction value ΔP is increased can be made small. As a result of this, even when the accelerator pedal is pushed down during the steady-state high-speed driving, as can be seen from the time chart of FIG. 12, an increase in line pressure $P_L$ can be effectively suppressed to a range in which the interference with the pulley pressure does not occur.

In contrast, the earlier line pressure control apparatus exhibits the poor line-pressure $P_L$ control response (or the poor line-pressure follow-up characteristic) as indicated by a region Y in FIG. 13. There arises the problem that line pressure $P_L$ decreases below primary pulley pressure Ppri, thus undesirably causing hunting in ratio-changing control. Furthermore, the deviation Δstep (=Δstep2=Astep−Bstep) between theoretical-transmission-ratio related number-of-steps Δstep of step motor 27 needed to achieve theoretical transmission gear ratio Ip and actual-transmission-ratio related number-of-steps Bstep is made large to achieve the theoretical transmission ratio Ip. Therefore, the increment itself by which line-pressure correction value ΔP is increased tends to increase. As a result, when the accelerator pedal is slowly pushed down during the steady-state high-speed driving, the shifting performance of belt-drive CVT 1 deteriorates. Also, it is difficult to suppress a rise in line pressure $P_L$.

As discussed above, in the line pressure control apparatus of the embodiment, theoretical transmission gear ratio Ip is determined based on engine/vehicle operating conditions, and then target transmission gear ratio I(0) is calculated based on theoretical transmission ratio Ip, taking into account at least a response delay (a first-order time lag), that is, {1/(Tm·s+1)} due to a hardware unit. Thirdly, target transmission ratio I(0) is converted into a number of steps of the reference model (simply, a reference-model number-of-steps StpMdl). Fourthly, actual transmission ratio ip is converted into a number of steps corresponding to actual transmission ratio (simply, an actual-transmission-ratio-ip-related number-of-steps Bstep). Fifthly, line pressure $P_L$ is corrected according to the deviation ERRstep (=StpMdl−Bstep) between reference-model number-of-steps StpMdl and actual-transmission-ratio-ip-related number-of-steps Bstep, in other words, the positional deviation Δstep of step motor 27. This improves the accuracy of calculation of the target deviation between target transmission ratio I(0) and actual transmission ratio ip. Additionally, the responsiveness of line-pressure feedback control, in other words, the follow-up performance of line pressure $P_L$, can be enhanced or improved. Consequently, an undesirable delay in a build-up of line pressure $P_L$, occurring owing to the poor responsiveness of line-pressure feedback control can be effectively avoided. Additionally, even when the accelerator pedal is slowly moderately depressed to accelerate the vehicle, the apparatus of the embodiment can improve fuel economy by proper suppression of line pressure $P_L$, while preventing unintended fluctuations or variations in line pressure $P_L$, for example, positive and negative variations relative to primary pulley pressure Ppri or secondary pulley pressure Psec, in other words, hunting (overshoot and/or undershoot) in line pressure $P_L$ with respect to the desired pressure value.

Figure 4A:
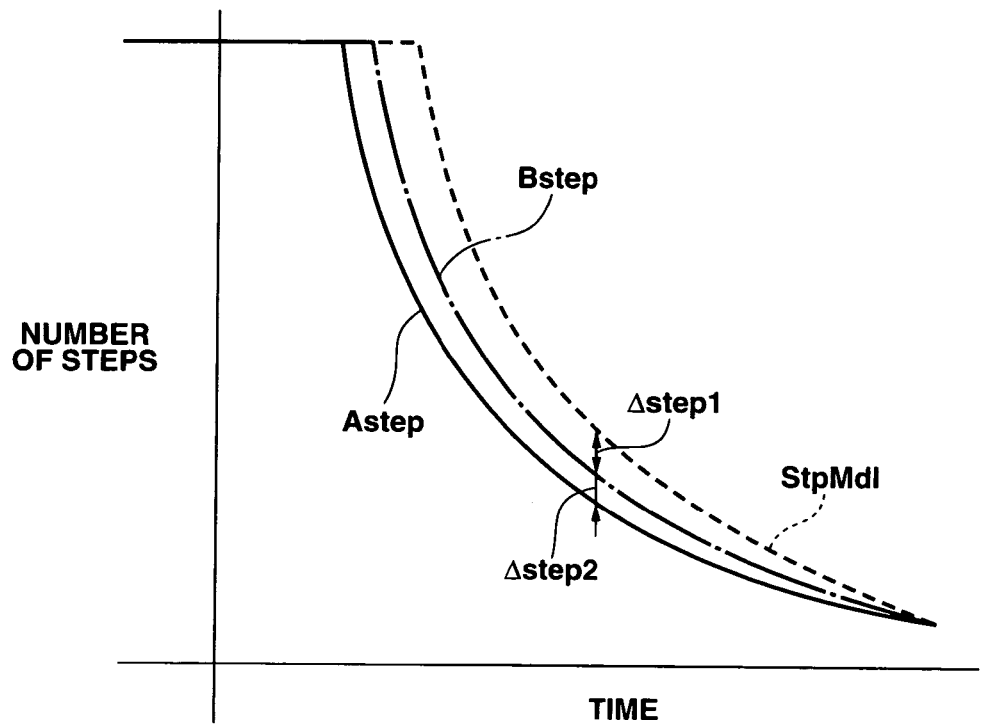
FIG. 4A is a preprogrammed time versus number-of-steps characteristic map used to determine a time constant Tm of a first-order lag system, suited to downshifting and used to calculate target transmission gear ratio I(0) within the shift control section of the CVT controller.

Especially, as described in reference to the characteristic map of FIG. 4A, in the apparatus of the embodiment, the response delay of hardware is taken as a first-order time lag, that is, {1/(Tm·s+1)}, and the time constant Tm of the first-order lag system {1/(Tm·s+1)} is set such that, during downshifting, the deviation ERRstep (=Δstep1=StpMdl−Bstep) between reference-model number-of-steps StpMdl and actual-transmission-ratio-ip-related number-of-steps Bstep, which deviation Δstep1 is calculated or derived by the apparatus of the embodiment, is set to be greater than the deviation Δstep2 (=Astep−Bstep) between theoretical-transmission-ratio related number-of-steps Astep of step motor 27 needed to achieve theoretical transmission gear ratio Ip and actual-transmission-ratio-ip-related number-of-steps Bstep, which deviation Δstep2 is calculated or derived by the earlier line pressure control apparatus. By virtue of the previously-noted setting of time constant Tm of the first-order lag system {1/(Tm·s+1)} during downshift, when the accelerator pedal is slowly depressed to accelerate the vehicle during the steady-state driving at high-speed side transmission ratios, line pressure $P_L$ rises accordingly. Hence, during downshift it is possible to ensure proper primary and secondary pulley thrusts corresponding to the ratio difference between the target transmission ratio and the actual transmission ratio.

Figure 4B:
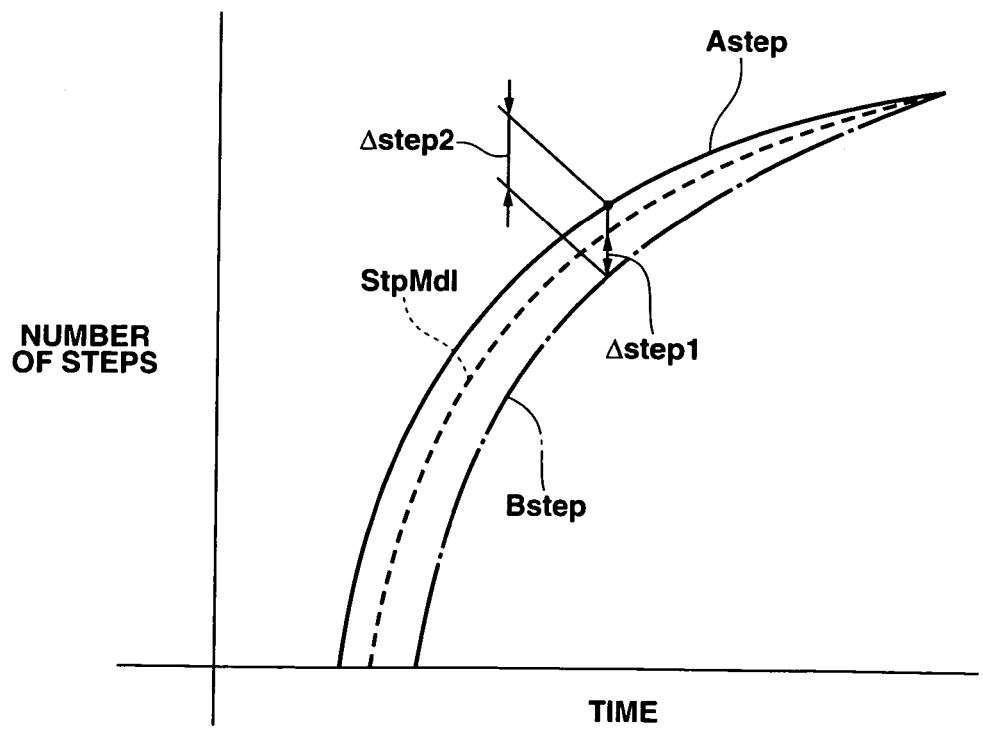
FIG. 4B is a preprogrammed time versus number-of-steps characteristic map used to determine a time constant Tm of a first-order lag system, suited to upshifting and used to calculate target transmission gear ratio I(0) within the shift control section of the CVT controller.

As described in reference to the characteristic map of FIG. 4B, in the apparatus of the embodiment, the response delay of hardware is taken as a first-order time lag, that is, {1/(Tm·s+1)}, and the time constant Tm of the first-order lag system {1/(Tm·s+1)} is set such that, during upshifting, the deviation ERRstep (=Δstep1=StpMdl−Bstep) between reference-model number-of-steps StpMdl and actual-transmission-ratio-ip-related number-of-steps Bstep, which deviation Δstep1 is calculated or derived by the apparatus of the embodiment, is set to be less than the deviation Δstep2 (=Astep−Bstep) between theoretical-transmission-ratio related number-of-steps Astep of step motor 27 needed to achieve theoretical transmission gear ratio Ip and actual-transmission-ratio-ip-related number-of-steps Bstep, which deviation Δstep2 is calculated or derived by the earlier line pressure control apparatus. By virtue of the previously-noted setting of time constant Tm of the first-order lag system {1/(Tm·s+1)} during upshift, line pressure $P_L$ cannot be risen unnecessarily for the purpose of further improvement of fuel economy. As a matter of course, fully taking into account the harmony with the operation and effects based on setting of time constant Tm during downshifting, it is preferable that time constant Tm of the first-order lag system is set to balance both of the operation and effects provided during downshifting and the operation and effects provided during upshifting.

Furthermore, in the line pressure control apparatus of the embodiment, as can be seen from steps S26-S28 of the line-pressure correction value ΔP calculation routine of FIG. 8 and from the circuits and devices denoted by reference sign 41 et seq. of FIG. 9, line pressure $P_L$ is corrected in such a manner as to reduce the positional deviation Δstep (ERRstep−LimStep). At this time, the positional deviation Δstep (ERRstep−LimStep) is multiplied by the $1^{st}$ gain G1 and thereafter integrated to produce an integration value G1×(∫Δstep). At the same time, the positional deviation Δstep (=ERRstep−LimStep) is multiplied by the $2^{nd}$ gain G2 to produce the product G2×(Δstep). The integration value G1×(∫Δstep) and the product G2×(Δstep) are summed up to produce the summed value G1×(∫Δstep)+G2×(Δstep). The $1^{st}$ gain G1 corresponds to an integrating-term variable gain, whereas the $2^{nd}$ gain G2 corresponds to a proportional-term variable gain. According to the apparatus of the embodiment, line pressure $P_L$ is corrected such that the summed value G1×(∫Δstep)+G2×(Δstep) decreases. In other words, the line pressure correction can be executed by way of proportional-plus-integral control in which the control signal is a linear combination {G1×(∫Δstep)+G2×(Δstep)} of the integration value G1×(∫Δstep) and the product G2×(Δstep), thus enhancing the accuracy in line pressure correction and the responsiveness (the follow-up performance) of feedback control.

Additionally, in the line pressure control apparatus of the embodiment, as can be seen from step S26 of the line-pressure correction value ΔP calculation routine of FIG. 8 and from the circuits and devices denoted by reference sign 39 et seq. of FIG. 9, in integrating and multiplying the positional deviation Δstep, actually, positional deviation Δstep (=ERRstep−LimStep) is integrated and multiplied regarding only the portions exceeding the allowed deviation LimStep of the deviation ERRstep (=StpMdl−Bstep) between reference-model number-of-steps StpMdl and actual-transmission-ratio-ip-related number-of-steps Bstep. Thus, regarding the integral control action, only the portion of the deviation ERRstep (=StpMdl−Bstep) exceeding the allowed deviation LimStep can be used for line pressure correction. Correction of line pressure $P_L$ is reduced to a bare minimum, thus reducing a wasteful execution time of line-pressure feedback control.

Further, in the line pressure control apparatus of the embodiment, as can be seen from the flow from step S24 to step S29 of the line-pressure correction value ΔP calculation routine of FIG. 8 and from the block diagram of FIG. 9, the integration and multiplication operations are stopped to hold the previous value G1×(∫Δstep)$_{(old)}$ of the integration value G1×(∫Δstep) and the previous value G2×(Δstep)$_{(old)}$ of the multiplication value G2×(Δstep), as long as the time rate of change Vi of actual transmission gear ratio ip, i.e., shifting speed is greater than or equal to reference set value V(0), that is, |Vi|≧V(0). Thus, it is possible to prevent line pressure correction (line-pressure $P_L$ feedback control) from being initiated owing to the positional deviation of step motor 27, arising from high shifting speed Vi (>V(0)). Consequently, the control accuracy for line pressure $P_L$ can be enhanced.

Additionally, in the line pressure control apparatus of the embodiment, as can be seen from the flow from step S25 to step S30 of the line-pressure correction value ΔP calculation routine of FIG. 8 and from the block diagram of FIG. 9, the line-pressure correction value ΔP remains reset to "0", as long as actual transmission gear ratio ip is greater than or equal to reference set value i0 (e.g., i0=1.0) corresponding to a low-speed side transmission gear ratio, that is, ip≧i0. Thus, it is possible to effectively reset the line-pressure correction value ΔP to "0", while the transmission ratio (the pulley ratio of belt-drive CVT 1) is within the low-speed side transmission ratio range in which there is a less possibility of the excess or shortage of line pressure $P_L$. As a result, line pressure correction (line-pressure feedback control) can be redone. It is possible to circumvent or eliminate the problem that the line pressure $P_L$ correction is continued based on the integration value G1×(∫Δstep) and the multiplication value G2×(Δstep) obtained heretofore in spite of elimination of the problem of the excessive or deficient line pressure $P_L$.

Further, in the line pressure control apparatus of the embodiment, as can be seen from step S27 of the line-pressure correction value ΔP calculation routine of FIG. 8 and from line-pressure correction value upper-lower limit value limiter 51 and line-pressure correction value increase-decrease rate limiter 52 of the block diagram of FIG. 9, the upper-and-lower limiter processing is made to the line-pressure correction value ΔP, and/or the upper-and-lower limiter processing is made to the time rate of change in line-pressure correction value ΔP. Thus, it is possible to prevent primary pulley pressure Ppri or secondary pulley pressure Psec originating from line pressure $P_L$ from suddenly varying or fluctuating owing to an undesirable increase in line-pressure correction value ΔP and/or a rapid rise (an excessive time rate of change d(ΔP)/dt) in line-pressure correction value ΔP, thereby avoiding an undesirable shift shock.

The line pressure control apparatus of the embodiment has the following effects.

(1) In a belt-drive continuously variable transmission 1 to which the line pressure control apparatus of the embodiment is applicable, power output is transmitted between primary and secondary pulleys 2 and 3 via drive belt 4. During such power transmission, in order to achieve a target transmission ratio I(0), a differential pressure between primary and secondary pulley pressures Ppri and Psec, both originating from line pressure $P_L$, is produced or created by bringing a shift actuator, such as step motor 27, into a control position corresponding to target transmission ratio (or target pulley ratio) I(0). In response to the differential pressure, the V-groove widths of primary and secondary variable-width pulleys 2 and 3 are varied to achieve target transmission ratio I(0). In the line pressure control apparatus of the embodiment, target transmission ratio I(0) is calculated from theoretical transmission ratio Ip determined based on engine-and-vehicle operating conditions, taking account of at least a response delay of hardware. Target transmission ratio I(0) is converted into a reference-model operative position (StpMdl) of the shift actuator (step motor 27) by way of a first preprogrammed conversion table. Actual transmission ratio ip, which is represented as a ratio (Npri/Nsec) of primary pulley speed Npri to secondary pulley speed Nsec, is converted into an actual-transmission-ratio related operative position (Bstep) corresponding to the actual operative position (the actual angular steps) of the shift actuator (step motor 27) by way of a second preprogrammed conversion table. A positional deviation (ERRstep=StpMdl−Bstep) between reference-model operative position (StpMdl) and actual-transmission-ratio related operative position (Bstep) is calculated. Line pressure $P_L$ is corrected or compensated for, so that the positional deviation (ERRstep=StpMdl−Bstep) reduces. According to the line pressure $P_L$ correction discussed above, target transmission ratio I(0) is calculated from theoretical transmission ratio Ip determined based on the engine/vehicle operating conditions, taking account of the hardware response delay. Then, line pressure $P_L$ is corrected or compensated for, based on the positional deviation (ERRstep=StpMdl−Bstep) between reference-model operative position (StpMdl) and actual-transmission-ratio related operative position (Bstep). This contributes to the improved and enhanced accuracy of calculation for the target deviation between a transmission-ratio command and actual transmission ratio ip, and improved feedback-control follow-up performance, thus avoiding a delay in line pressure rise, or unintended fluctuations or variations in line pressure $P_L$, for example, positive and negative variations relative to primary pulley pressure Ppri or secondary pulley pressure Psec, that is, undesirable hunting (overshoot and/or undershoot) in line pressure $P_L$ with respect to the desired pressure value, in the case of the slow depression of the accelerator pedal for vehicle acceleration. According to the line pressure correction executed by the line pressure control apparatus of the embodiment, it is possible to improve fuel economy by proper suppression of line pressure $P_L$, while preventing the previously-noted undesirable phenomena.

(2) Additionally, the hardware response delay is taken as a first-order time lag {1/(Tm·s+1)}. Theoretical transmission ratio Ip is converted into a theoretical-transmission-ratio related operative position (corresponding to the number of steps Astep of the shift actuator (step motor 27) needed to achieve theoretical transmission ratio Ip) by way of a third preprogrammed conversion table. Time constant Tm that determines the first-order time lag, is determined or set so that, during a downshift, the deviation Δstep1 (=ERRstep=StpMdl−Bstep) between reference-model operative position (corresponding to reference-model number-of-steps StpMdl) and actual-transmission-ratio related operative position (corresponding to actual-transmission-ratio related number-of-steps Bstep) is set to be greater than the deviation Δstep2 (=Astep−Bstep) between theoretical-transmission-ratio related operative position (Astep) and actual-transmission-ratio related operative position (Bstep). By virtue of the setting (Δstep1>Δstep2) of time constant Tm of the first-order lag system {1/(Tm·s+1)} during the downshift, when the accelerator pedal is slowly depressed to accelerate the vehicle during the steady-state driving at transmission ratios adapted for high speeds, line pressure $P_L$ rises accordingly. As a result of this, during the downshift it is possible to ensure proper primary and secondary pulley thrusts corresponding to the ratio difference between the target transmission ratio and the actual transmission ratio.

(3) Additionally, time constant Tm that determines the first-order time lag, is determined or set so that, during an upshift, the deviation Δstep1 (=ERRstep=StpMdl−Bstep) between reference-model operative position (corresponding to reference-model number-of-steps StpMdl) and actual-transmission-ratio related operative position (corresponding to actual-transmission-ratio related number-of-steps Bstep) is set to be less than the deviation Δstep2 (=Astep−Bstep) between theoretical-transmission-ratio related operative position (Astep) and actual-transmission-ratio related operative position (Bstep). By virtue of the setting (Δstep1<Δstep2) of time constant Tm of the first-order lag system {1/(Tm·s+1)} during the upshift, line pressure $P_L$ cannot be risen unnecessarily for the purpose of further improvement of fuel economy. Fully taking into account the harmony with the operation and effects based on setting of time constant Tm during downshifting, it is preferable that time constant Tm of the first-order lag system is set to balance both of the operation and effects provided during downshifting and the operation and effects provided during upshifting.

(4) In correcting line pressure $P_L$ so that the positional deviation (ERRstep=StpMdl−Bstep) reduces, the positional deviation is integrated to produce an integration value (substantially corresponding to ∫Δstep), and then the integration value is multiplied by an integrating-term gain G1 to produce a first product (G1×∫Δstep). Additionally, the positional deviation is multiplied by a proportional-term gain G2 to produce a second product (G2×Δstep). Line pressure $P_L$ is corrected or compensated for so that the summed value (G1×∫Δstep+G2×Δstep) of the first and second products decreases. By virtue of the linear combination of both of the integrating term (G1×∫Δstep) and the proportional term (G2×Δstep) of the error signal, it is possible to realize the high-precision line pressure correction and enhanced feedback follow-up performance.

(5) In integrating the positional deviation (ERRstep=StpMdl−Bstep), the previously-noted integration and multiplication operations are made to an excess of the positional deviation (ERRstep=StpMdl−Bstep) over an allowed deviation (LimStep), in other words, a difference (ERRstep−LimStep) being obtained by subtracting allowed deviation (LimStep) from positional deviation (ERRstep=StpMdl−Bstep). By way of line pressure correction made to only the excess (ERRstep−LimStep), line pressure $P_L$ correction can be reduced to a bare minimum, thereby preventing the line-pressure feedback control action from being wastefully initiated.

(6) Either the summed value (G1×∫Δstep+G2×Δstep) or the positional deviation (ERRstep=StpMdl−Bstep) between reference-model operative position (StpMdl) and actual-transmission-ratio related operative position (Bstep) is converted into or set to an excessive or deficient amount of line pressure $P_L$ (line-pressure correction value ΔP). The line pressure $P_L$ correction is executed so that the excessive or deficient amount (line-pressure correction value ΔP) reduces. As set out above, such a line-pressure compensation system is practical.

(7) In the line pressure control apparatus of the embodiment, the previous value {G1×(∫Δstep)$_{(old)}$} of the integration value (G1×∫Δstep) and the previous value {G2×(Δstep)$_{(old)}$} of the multiplication value (G2×Δstep) are held or kept unchanged as long as a time rate of change Vi of actual transmission ratio ip (i.e., (shifting speed Vi)) is greater than or equal to a first threshold value V(0), that is, |Vi|≧V(0). Thus, the apparatus can prevent line pressure correction (line-pressure $P_L$ feedback control) from being initiated owing to the positional deviation of step motor 27, arising from high shifting speed Vi (>V(0)), thereby enhancing the control accuracy for line pressure $P_L$.

(8) Additionally, in the line pressure control apparatus of the embodiment, the excessive or deficient amount (line-pressure correction value ΔP) is reset to zero, as long as actual transmission ratio ip is greater than or equal to a second threshold value i0 (e.g., i0=1.0) corresponding to a transmission ratio adapted for low speeds. Thus, the apparatus of the embodiment can effectively reset line-pressure correction value ΔP to zero, while actual transmission ratio ip is within a low-speed side transmission ratio range in which there is a less possibility of the excess or shortage of line pressure $P_L$. As a result, line pressure correction (line-pressure feedback control) can be redone. The apparatus of the embodiment can eliminate the problem that the line pressure $P_L$ correction is continued based on the integration value (G1×∫Δstep) and the multiplication value (G2×Δstep) obtained heretofore in spite of elimination of the problem of the excessive or deficient line pressure $P_L$.

(9) Preferably, upper and lower limits may be set for line-pressure correction value ΔP. More preferably, upper and lower limits may be set for the time rate of change of line-pressure correction value ΔP. The limiter circuit serves to prevent primary pulley pressure Ppri or secondary pulley pressure Psec originating from line pressure $P_L$ from suddenly varying or fluctuating owing to an undesirable increase in line-pressure correction value ΔP and/or an excessive time rate of change d(ΔP)/dt in line-pressure correction value ΔP, thereby avoiding an undesirable shift shock.

The entire contents of Japanese Patent Application No. 2004-292789 (filed Oct. 5, 2004) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A line pressure control apparatus of a belt-drive continuously variable transmission employing a primary variable-width pulley of a driving pulley side, a secondary variable-width pulley of a driven pulley side, a drive belt running in the primary and secondary pulleys, and a shift actuator, and whose target transmission ratio is achieved by varying V-groove widths of the primary and secondary pulleys by way of a differential pressure between primary and secondary pulley pressures, both originating from line pressure, the differential pressure being created by bringing the shift actuator into a control position corresponding to the target transmission ratio, comprising:
    a vehicular information detector that detects engine-and-vehicle operating conditions;
    a hydraulic modulator that regulates the primary and secondary pulley pressures;
    a control unit being configured to be electrically connected to the vehicular information detector and the hydraulic modulator, for automatically controlling the hydraulic actuator depending on the operating conditions; the control unit comprising a processor programmed to perform the following,
    (a) determining a theoretical transmission ratio based on the operating conditions;
    (b) calculating the target transmission ratio based on the theoretical transmission ratio, taking account of at least a hardware response delay;
    (c) converting the target transmission ratio into a reference-model operative position of the shift actuator;
    (d) calculating an actual transmission ratio as a ratio of a rotational speed of the primary pulley to a rotational speed of the secondary pulley;
    (e) converting the actual transmission ratio into an actual-transmission-ratio related operative position of the shift actuator;
    (f) calculating a positional deviation between the reference-model operative position and the actual-transmission-ratio related operative position; and
    (g) correcting the line pressure in a manner so as to reduce the positional deviation.

2. The line pressure control apparatus as claimed in claim 1, wherein said processor is further programmed for:
    (h) determining the hardware response delay as a first-order time lag;
    (i) converting the theoretical-transmission ratio into a theoretical-transmission-ratio related operative position of the shift actuator;
    (j) calculating a positional deviation between the theoretical-transmission-ratio related operative position and the actual-transmission-ratio related operative position; and
    (k) determining a time constant that determines the first-order time lag, so that, during a downshift, the deviation between the reference-model operative position and the actual-transmission-ratio related operative position is set to be greater than the deviation between the theoretical-transmission-ratio related operative position and the actual-transmission-ratio related operative position.

3. The line pressure control apparatus as claimed in claim 1, wherein said processor is further programmed for:
    (h) determining the hardware response delay as a first-order time lag;
    (i) converting the theoretical transmission ratio into a theoretical-transmission-ratio related operative position of the shift actuator;
    (j) calculating a positional deviation between the theoretical-transmission-ratio related operative position and the actual-transmission-ratio related operative position; and
    (k) determining a time constant that determines the first-order time lag, so that, during an upshift, the deviation between the reference-model operative position and the actual-transmission-ratio related operative position is set to be less than the deviation between the theoretical-transmission-ratio related operative position and the actual-transmission-ratio related operative position.

4. The line pressure control apparatus as claimed in claim 1, wherein said processor is further programmed for:
    (l) integrating the positional deviation between the reference-model operative position and the actual-transmission-ratio related operative position to produce an integration value;
    (m) multiplying the integration value by a first gain to produce a first product;
    (n) multiplying the positional deviation between the reference-model operative position and the actual-transmission-ratio related operative position by a second gain to produce a second product;
    (o) calculating a summed value of the first and second products; and
    (p) correcting the line pressure in a manner so as to reduce the summed value.

5. The line pressure control apparatus as claimed in claim 4, wherein:
    the integrating and multiplying operations for the positional deviation, are made to an excess of the positional deviation over an allowed deviation, the excess being obtained by subtracting the allowed deviation from the positional deviation.

6. The line pressure control apparatus as claimed in claim 5, wherein said processor is further programmed for:
    (q) converting either one of the summed value and the positional deviation between the reference-model operative position and the actual-transmission-ratio related operative position into a line-pressure correction value; and (r) correcting the line pressure in a manner so as to reduce the line-pressure correction value.

7. The line pressure control apparatus as claimed in claim 4, wherein said processor is further programmed for:
(s) holding a previous value of the integration value and a previous value of a multiplication value corresponding to the second product, as long as a time rate of change of the actual transmission ratio is greater than or equal to a threshold value.

8. The line pressure control apparatus as claimed in claim 6, wherein said processor is further programmed for:
(t) resetting the line-pressure correction value to zero, as long as the actual transmission ratio (ip) is greater than or equal to a threshold value (i0) corresponding to a transmission ratio adapted for low speeds.

9. The line pressure control apparatus as claimed in claim 6, wherein said processor is further programmed for:
(u) setting upper and lower limits for the line-pressure correction value ($\Delta P$).

10. The line pressure control apparatus as claimed in claim 9, wherein said processor is further programmed for:
(v) setting upper and lower limits for a time rate of change in the line-pressure correction value ($\Delta P$).

11. A method of controlling a belt-drive continuously variable transmission employing a primary variable-width pulley of a driving pulley side, a secondary variable-width pulley of a driven pulley side, a drive belt running in the primary and secondary pulleys, and a shift actuator, and whose target transmission ratio is achieved by varying V-groove widths of the primary and secondary pulleys by way of a differential pressure between primary and secondary pulley pressures, both originating from line pressure, the differential pressure being created by bringing the shift actuator into a control position corresponding to the target transmission ratio, the method comprising:
detecting engine-and-vehicle operating conditions;
determining a theoretical transmission ratio based on the operating conditions;
calculating the target transmission ratio based on the theoretical transmission ratio, taking account of at least a hardware response delay and a disturbance;
converting the target transmission ratio into a reference-model operative position of the shift actuator;
calculating an actual transmission ratio as a ratio of a rotational speed of the primary pulley to a rotational speed of the secondary pulley;
converting the actual transmission ratio into an actual-transmission-ratio related operative position of the shift actuator;
calculating a positional deviation between the reference-model operative position and the actual-transmission-ratio related operative position; and
correcting the line pressure in a manner so as to reduce the positional deviation.

12. The method as claimed in claim 11, further comprising:
determining the hardware response delay as a first-order time lag;
converting the theoretical transmission ratio into a theoretical-transmission-ratio related operative position of the shift actuator;
calculating a positional deviation between the theoretical-transmission-ratio related operative position and the actual-transmission-ratio related operative position; and
determining a time constant that determines the first-order time lag, so that, during a downshift, the deviation between the reference-model operative position and the actual-transmission-ratio related operative position is set to be greater than the deviation between the theoretical-transmission-ratio related operative position and the actual-transmission-ratio related operative position.

13. The method as claimed in claim 11, further comprising:
determining the hardware response delay as a first-order time lag;
converting the theoretical transmission ratio into a theoretical-transmission-ratio related operative position of the shift actuator;
calculating a positional deviation between the theoretical-transmission-ratio related operative position and the actual-transmission-ratio related operative position; and
determining a time constant that determines the first-order time lag, so that, during an upshift, the deviation between the reference-model operative position and the actual-transmission-ratio related operative position is set to be less than the deviation between the theoretical-transmission-ratio related operative position and the actual-transmission-ratio related operative position.

14. The method as claimed in claim 11, further comprising:
integrating the positional deviation between the reference-model operative position and the actual-transmission-ratio related operative position to produce an integration value;
multiplying the integration value by a first gain to produce a first product;
multiplying the positional deviation between the reference-model operative position and the actual-transmission-ratio related operative position by a second gain to produce a second product;
calculating a summed value of the first and second products; and
correcting the line pressure in a manner so as to reduce the summed value.

15. The method as claimed in claim 14, wherein:
the integrating and multiplying operations for the positional deviation, are made to an excess of the positional deviation over an allowed deviation, the excess being obtained by subtracting the allowed deviation from the positional deviation.

16. The method as claimed in claim 15, further comprising:
converting either one of the summed value and the positional deviation between the reference-model operative position and the actual-transmission-ratio related operative position into a line-pressure correction value; and
correcting the line pressure in a manner so as to reduce the line-pressure correction value.

17. The method as claimed in claim 14, further comprising:
holding a previous value of the integration value and a previous value of a multiplication value corresponding to the second product, as long as a time rate of change of the actual transmission ratio is greater than or equal to a threshold value.

18. The method as claimed in claim 16, further comprising:
resetting the line-pressure correction value to zero, as long as the actual transmission ratio is greater than or equal to a threshold value corresponding to a transmission ratio adapted for low speeds.

19. The method as claimed in claim 16, further comprising:
setting upper and lower limits for the line-pressure correction value.

20. The method as claimed in claim 16, further comprising:
setting upper and lower limits for a time rate of change in the line-pressure correction value.

* * * * *